US012681218B2

(12) United States Patent
Kotani et al.

(10) Patent No.: US 12,681,218 B2
(45) Date of Patent: Jul. 14, 2026

(54) LIGHT-ABSORBING HEAT-SHIELDING FILM, LIGHT-ABSORBING HEAT-SHIELDING MEMBER, ARTICLE, AND METHOD FOR PRODUCING THEM

(71) Applicant: CANON KABUSHIKI KAISHA, Tokyo (JP)

(72) Inventors: Yoshinori Kotani, Kanagawa (JP); Hiroshi Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 724 days.

(21) Appl. No.: 18/156,942

(22) Filed: Jan. 19, 2023

(65) Prior Publication Data

US 2023/0161083 A1 May 25, 2023

Related U.S. Application Data

(63) Continuation of application No. PCT/JP2021/026956, filed on Jul. 19, 2021.

(30) Foreign Application Priority Data

Jul. 22, 2020 (JP) ................................. 2020-125161

(51) Int. Cl.
G02B 5/00 (2006.01)
G02B 1/113 (2015.01)
(52) U.S. Cl.
CPC .............. G02B 5/003 (2013.01); G02B 1/113 (2013.01)

(58) Field of Classification Search
CPC ........ G02B 5/003; G02B 1/113; G02B 1/118; G02B 5/204; G02B 5/208; G02B 5/00; B82Y 20/00; B82Y 30/00; B82Y 40/00; B32B 15/01; B32B 3/30; B32B 7/023; B32B 7/027; B32B 15/04; F16L 59/08
See application file for complete search history.

(56) References Cited

U.S. PATENT DOCUMENTS

| | | | | |
|---|---|---|---|---|
| 4,589,972 A * | 5/1986 | Pompea | .................. | F24S 70/25 |
| | | | | 205/213 |
| 5,120,605 A * | 6/1992 | Zuel | ........................ | C03C 15/00 |
| | | | | 428/156 |
| 6,929,861 B2 * | 8/2005 | Lin | .......................... | C03C 17/25 |
| | | | | 428/156 |
| 2010/0165468 A1 * | 7/2010 | Yamada | ................. | G02B 5/003 |
| | | | | 359/613 |
| 2011/0003121 A1 * | 1/2011 | Tsuda | ..................... | G02B 1/118 |
| | | | | 428/156 |

(Continued)

FOREIGN PATENT DOCUMENTS

| | | |
|---|---|---|
| CN | 102203639 A | 9/2011 |
| CN | 105917253 A | 8/2016 |

(Continued)

OTHER PUBLICATIONS

Nakazato, J. et al., "Black Electroless Ni Plating", pp. 503-506, vol. 1.66, No. 11.

*Primary Examiner* — Balram T Parbadia

(74) *Attorney, Agent, or Firm* — Canon U.S.A., Inc. IP Division

(57) ABSTRACT

A metal layer includes a protrusion-and-recess shaped object, in which the protrusion-and-recess shaped object is characterized in that a second protrusion-and-recess structure is disposed on a first protrusion-and-recess structure.

26 Claims, 9 Drawing Sheets

(56)     References Cited

U.S. PATENT DOCUMENTS

| | | | |
|---|---|---|---|
| 2012/0069443 A1* | 3/2012 | Taguchi | G02B 1/118 |
| | | | 359/601 |
| 2013/0027780 A1* | 1/2013 | Iwata | G02B 1/118 |
| | | | 359/601 |
| 2013/0239924 A1* | 9/2013 | Sato | F02B 77/02 |
| | | | 123/198 R |
| 2014/0042426 A1* | 2/2014 | Nishimura | H10K 59/879 |
| | | | 362/335 |
| 2015/0202834 A1 | 7/2015 | Free | |
| 2018/0057954 A1* | 3/2018 | Yamashita | C25D 11/30 |
| 2019/0033490 A1* | 1/2019 | Wiensch | C23C 22/84 |

FOREIGN PATENT DOCUMENTS

| | | | |
|---|---|---|---|
| JP | 2004261910 A | 9/2004 |
| JP | 2015205408 A | 11/2015 |
| JP | 2016203490 A | 12/2016 |
| JP | 2017508640 A | 3/2017 |
| JP | 2017161590 A | 9/2017 |
| JP | 2020164993 A | 10/2020 |
| WO | 2019022924 A2 | 1/2019 |

* cited by examiner

LIGHT-ABSORBING HEAT-SHIELDING FILM, LIGHT-ABSORBING HEAT-SHIELDING MEMBER, ARTICLE, AND METHOD FOR PRODUCING THEM

CROSS-REFERENCE TO RELATED APPLICATIONS

This application is a Continuation of International Patent Application No. PCT/JP2021/026956, filed Jul. 19, 2021, which claims the benefit of Japanese Patent Application No. 2020-125161, filed Jul. 22, 2020, both of which are hereby incorporated by reference herein in their entirety.

TECHNICAL FIELD

The present invention relates to a light-absorbing heat-shielding film, a light-absorbing heat-shielding member, an article, and methods for producing them.

BACKGROUND ART

In recent years, the use of heat-shielding materials to suppress an increase in temperature has been expanding in the interior and exterior components of optical apparatuses, space apparatuses, and transport apparatuses. A material that is a heat-shielding material and also has light absorption properties can reduce noise due to stray light when used inside a lens barrel or for diaphragm films of an infrared camera, and is less likely to increase in temperature and has high dimensional stability. For this reason, a material having both light absorption properties and heat shielding properties is required. Conventionally, as a light-absorbing material, a material subjected to black electroless nickel plating is known as a light-absorbing material (for example, Non Patent Literature 1). In this case, the light-absorbing material is formed by oxidizing a nickel plating on a surface of an object to form microscopic irregularities and blacken the surface. A technique has been disclosed to produce a resin having a surface with a microstructure by injection molding using a mold having a metal surface with microscopic irregularities (for example, Patent Literature 1).

CITATION LIST

Patent Literature

PTL 1: Japanese Patent Laid-Open No. 2004-261910

Non Patent Literature

NPL 1: "Black Electroless Nickel Plating", Journal of the Surface Finishing Society of Japan, Vol. 66, No. 11, 503-506, 2015

However, the black-colored material disclosed in Non Patent Literature 1 has a problem in that it emits a large amount of radiation even in the far-infrared region and does not exhibit excellent heat shielding properties. The invention described in Patent Literature 1 relates to injection molding of a resin using a mold and cannot provide the formation of a highly versatile metal film. The resin is difficult to use for various products as a light-absorbing heat-shielding member and has a disadvantage in practical use.

A heat-shielding material usually has the problem of the reflections of an ambient light source in accordance with the shooting angle of a thermal imaging camera, making it difficult to see a heat-shielding subject (i.e., there is an intense reflection (glare) of light emitted from a light source).

SUMMARY OF INVENTION

The present invention has been made in view of the above problems. It is an object of the present invention to provide a light-absorbing heat-shielding member that has characteristics of absorption of visible and near-infrared light and low far-infrared radiation, which are normally incompatible, and that is configured to reduce the reflections of an ambient light source.

According to an embodiment of the present invention, a metal layer includes a protrusion-and-recess shaped object, in which the protrusion-and-recess shaped object is characterized in that a second protrusion-and-recess structure is disposed on a first protrusion-and-recess structure.

According to an embodiment of the present invention, a light-absorbing heat-shielding film includes a metal layer, in which the metal layer includes a base section and a protrusion-and-recess shaped section disposed on the base section, the protrusion-and-recess shaped section includes a first protrusion-and-recess structure including multiple protruding portions, and a second protrusion-and-recess structure disposed on each of the multiple protruding portions, the second protrusion-and-recess structure including multiple protruding portions, the base section extends below the multiple protruding portions included in the first protrusion-and-recess structure, and main components of metal materials of the base section, the first protrusion-and-recess structure, and the second protrusion-and-recess structure are identical.

According to an embodiment of the present invention, a method for producing a light-absorbing heat-shielding film includes the steps of providing a mold having a protrusion-and-recess shape, and forming, on the mold, a metal layer to which the protrusion-and-recess shape is transferred, in which the mold has a protrusion-and-recess structure including multiple recessed portions, and the protrusion-and-recess shape includes multiple recessed portions disposed on a surface of each of the multiple recessed portions included in the protrusion-and-recess structure.

According to an embodiment of the present invention, a method for producing a light-absorbing heat-shielding film includes a step of providing a substrate having a protrusion-and-recess structure, a first step of forming the protrusion-and-recess shape of a metal oxide on the substrate, and a second step of forming a metal layer on the protrusion-and-recess shape of the metal oxide.

Further features of the present invention will become apparent from the following description of exemplary embodiments with reference to the attached drawings.

DESCRIPTION OF EMBODIMENTS

Figure 1A:
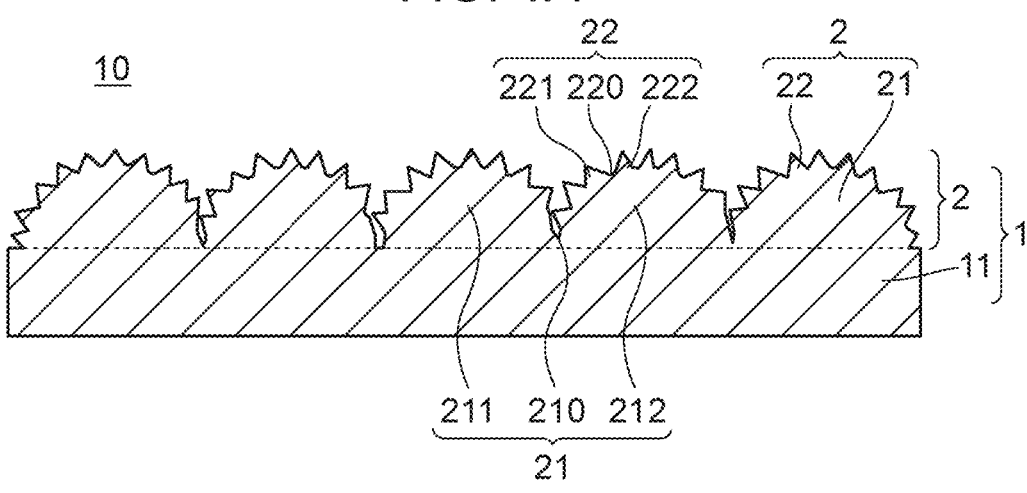
FIG. 1A is a schematic view illustrating a light-absorbing heat-shielding film according to an embodiment of the present invention.

Embodiments of the present invention will be described in detail below.

A light-absorbing heat-shielding film according to an embodiment includes a fine protrusion-and-recess shaped object. The fine protrusion-and-recess shaped object has a hierarchical structure. The hierarchical structure includes a first protrusion-and-recess structure (first structure) and a second protrusion-and-recess structure (second structure). The light-absorbing heat-shielding film according to the embodiment includes a metal layer. The metal layer includes a base section, the first protrusion-and-recess structure (first structure), and the second protrusion-and-recess structure (second structure), in which the first protrusion-and-recess structure (first structure) is disposed on the base section, and the second protrusion-and-recess structure (second structure) is disposed on the first protrusion-and-recess structure (first structure). That is, the fine protrusion-and-recess shaped object included in the light-absorbing heat-shielding film is the metal layer. In this specification, the fine protrusion-and-recess shaped object is also referred to simply as the "protrusion-and-recess shaped object".

Highly conductive metals, such as aluminum and nickel, have low far-infrared radiation and heat shielding properties, but do not exhibit light absorption properties. A fine protrusion-and-recess shape having a subwavelength structure smaller than the wavelength of visible light is known to have an antireflection effect, and is known to exhibit excellent wavelength band characteristics and incident angle characteristics owing to continuously varying spatial occupancy of the structure portion. When a metal has a surface with the fine protrusion-and-recess shape, reflections from the metal surface are reduced in a wide wavelength region of visible light to reduce the reflectance in the entire visible light region. The surface appears black, and light absorption properties are exhibited. A metal member having a fine protrusion-and-recess structure on the surface thereof can be considered to have both light absorption and heat shielding properties. The light-absorbing material disclosed in NPL 1 has, on its surface, a fine protrusion-and-recess shape obtained by oxidation of a nickel surface. However, the light-absorbing material emits a large amount of radiation even in the far-infrared region (low reflectance), and does not exhibit heat shielding properties. Furthermore, in practical use, a heat-shielding material has the problem of the reflections of an ambient light source in accordance with the shooting angle of a thermal imaging camera, making it difficult to see a heat-shielding subject (i.e., there is an intense reflection (glare) of light emitted from a light source).

Accordingly, the inventors have found that, in addition to the heat shielding properties of a metal itself contained in a light-absorbing heat-shielding film, the formation of a fine hierarchical structure in the fine protrusion-and-recess shape of a metal surface exhibits light absorption and heat shielding properties while the reflections of an ambient light source are reduced. These findings have resulted in the completion of the embodiment.

The fine hierarchical structure has at least two types of structures having different structure sizes, and, for example, refers to a structure having both a first structure having a structure size of the order of micrometers and a second structure having a structure size of the order of sub-micrometers. The first structure has the effect of reducing the reflections of an ambient light source. The second structure has a reduced reflectance in the entire visible light region, appears black, and exhibits light absorption properties.

The light absorption properties, the heat shielding properties, and the effect of reducing the reflections of the light source can be widely controlled by appropriately combining the size of the fine surface structure of the light-absorbing heat-shielding film and a material used for the film.

<Light-Absorbing Heat-Shielding Film>

The light-absorbing heat-shielding film of the embodiment will be described with reference to FIG. 1. As illustrated in FIG. 1A, the light-absorbing heat-shielding film according to an embodiment of the present invention is a light-absorbing heat-shielding film 10 including a metal layer 1 that includes a fine protrusion-and-recess shaped section 2 (protrusion-and-recess shaped section) on a surface thereof. The light-absorbing heat-shielding film 10 has a base section 11 below the fine protrusion-and-recess shaped section 2. The base section 11 is a portion of the metal layer 1. As a material of the base section 11 of the metal layer 1, a highly conductive metal is preferred. Examples of the highly conductive metal include silver, copper, gold, aluminum, magnesium, tungsten, cobalt, zinc, nickel, and chromium. Nickel, zinc, and chromium are preferred. Nickel is particularly preferred. The fine protrusion-and-recess shaped section 2 disposed on the surface of the metal layer 1 is also preferably composed of the highly conductive metal, and more preferably composed of the same metal as that of the base section 11 of the metal layer 1.

A transparent metal oxide may be attached to the surface of the fine protrusion-and-recess shaped section 2. In other words, the light-absorbing heat-shielding film 10 may contain a transparent metal oxide on the surface of a fine protrusion-and-recess shaped object (fine protrusion-and-recess shaped section 2), which is the metal layer 1. The metal component of the metal oxide attached to the surface of the fine protrusion-and-recess shaped section 2 may be different from the metal component of the metal layer 1. That is, for example, when the material of the metal layer 1 is nickel, the metal oxide attached to the surface of the fine protrusion-and-recess shaped section 2 may be an oxide of a metal other than nickel. Accordingly, the metal oxide attached to the surface of the fine protrusion-and-recess shaped section 2 may be distinguished from a metal oxide that contains the same metal component as that of the metal layer 1 and that is formed by, for example, natural oxidation of the metal layer 1. The attached metal oxide preferably contains aluminum oxide as a main component, and may be crystals containing aluminum oxide as a main component. The crystals containing aluminum oxide as a main component are formed of crystals containing an oxide or hydroxide of aluminum or a hydrate thereof as a main component, and are particularly preferably boehmite. The crystals containing aluminum oxide as a main component may be crystals composed only of aluminum oxide, or may be crystals containing a trace amount of, for example, zirconium, silicon, titanium, or zinc in aluminum oxide crystals.

The metal layer 1 includes the base section 11 and the fine protrusion-and-recess shaped section 2 disposed on the base section 11. The base section 11 is a section in which the metal layer 1 is continuous in the extending direction (lateral direction in FIG. 1) of the light-absorbing heat-shielding film 10. The fine protrusion-and-recess shaped section 2 is a section in which the metal layer 1 is discontinuous in the extending direction (lateral direction in FIG. 1) of the light-absorbing heat-shielding film 10. In FIG. 1, a boundary 12 between the base section 11 and the fine protrusion-and-recess shaped section 2 is indicated by a broken line.

The fine protrusion-and-recess shaped section 2 is a section having a fine protrusion-and-recess shape disposed on one surface of the metal layer 1. The fine protrusion-and-recess shaped section 2 has a hierarchical structure. The fine protrusion-and-recess shaped section 2 has a first protrusion-and-recess structure 21 and a second protrusion-and-recess structure 22. An object including the fine protrusion-and-recess shaped section 2 is the fine protrusion-and-recess shaped object. The fine protrusion-and-recess shaped section 2 is the whole or part of the fine protrusion-and-recess shaped object. Thus, the fine protrusion-and-recess shaped section 2 can also be referred to as the fine protrusion-and-recess shaped object.

The first protrusion-and-recess structure 21 includes multiple protruding portions (for example, protruding portions 211 and protruding portions 212). The first protrusion-and-recess structure 21 also includes multiple recessed portions (for example, recessed portions 210 between the protruding portions 211 and the protruding portions 212). The protruding portions 211 and 212 of the first protrusion-and-recess structure 21 are portions of the metal layer 1. The recessed portions 210 of the first protrusion-and-recess structure 21 are spaces where the metal layer 1 is not present and where a substance other than the metal layer 1 can be present.

The second protrusion-and-recess structure 22 includes multiple protruding portions (for example, protruding portions 221 and protruding portions 222). The second protrusion-and-recess structure 22 also includes multiple recessed portions (for example, recessed portions 220 between the protruding portions 221 and the protruding portions 222). The protruding portions 221 and 222 of the second protrusion-and-recess structure 22 are portions of the metal layer 1. The recessed portions 220 of the second protrusion-and-recess structure 22 are spaces where the metal layer 1 is not present and where a substance other than the metal layer 1 can be present.

The second protrusion-and-recess structure 22 is disposed on the first protrusion-and-recess structure 21. The second protrusion-and-recess structure 22 is disposed on each of the multiple protruding portions (for example, the protruding portions 211 and the protruding portions 212) included in the first protrusion-and-recess structure 21. The main components of the metal materials of the first protrusion-and-recess structure 21 and the second protrusion-and-recess structure 22 are preferably identical.

The metal layer 1, which is the protrusion-and-recess shaped object of the light-absorbing heat-shielding film 10, includes the base section 11 below the first protrusion-and-recess structure 21, the base section 11 being composed of a metal material containing the same main component as the first protrusion-and-recess structure 21 and the second protrusion-and-recess structure 22. The base section 11 extends below the multiple protruding portions (for example, the protruding portions 211 and the protruding portions 212) included in the first protrusion-and-recess structure 21. In contrast, in the fine protrusion-and-recess shaped section 2, the metal layer 1 is discontinuous because of the recessed portions (for example, the recessed portions 210) of the first protrusion-and-recess structure 21.

The main components of the metal materials of the base section 11, the first protrusion-and-recess structure 21, and the second protrusion-and-recess structure 22 are preferably identical. When the base section 11, the first protrusion-and-recess structure 21, and the second protrusion-and-recess structure 22 are composed of a common metal material (that is, the metal layer 1 formed of a single layer), it is possible to achieve excellent light absorption and heat shielding properties, compared with the case where these are composed of different metal materials (that is, a metal layer formed of multiple layers).

The first protrusion-and-recess structure 21 preferably has an average roughness Ra1 of 0.1 μm or more and 5 μm or less, and the second protrusion-and-recess structure 22 preferably has an average roughness Ra2 of 1 nm or more and 50 nm or less.

The average roughness of the fine protrusion-and-recess shaped section 2 or the average roughness of the fine protrusion-and-recess shaped section 2 to which a transparent metal oxide is attached refers to the arithmetic average roughness defined in "Definition and Presentation of Surface Roughness" of JIS-B-061. Only a reference length is sampled from a roughness curve in the direction of its average line. The X-axis is taken in the direction of the average line of the sampled portion, and the Y-axis is taken in the direction of the vertical magnification. When the roughness curve is represented by y=f(x), the average roughness is calculated from the following formula (1).

$$Ra = \frac{1}{L} \int_0^L |f(x)| dx$$

In formula (1), Ra is the average roughness (nm), L is the reference length, and F(X, Y) is the height at the measurement point (X, Y) where the X coordinate is X and the Y coordinate is Y.

In the light-absorbing heat-shielding film 10 according to the embodiment, the maximum height Rz1 of the first protrusion-and-recess structure 21 on the surface of the metal layer 1 is preferably 1 μm or more and 10 μm or less, and the maximum height Rz2 of the second protrusion-and-recess structure 22 is preferably 100 nm or more and 800 nm or less.

The maximum height of the fine protrusion-and-recess shaped section 2 or the maximum height of the fine protrusion-and-recess shaped section 2 to which the transparent metal oxide is attached refers to the maximum height defined in "Definition and Presentation of Surface Roughness" of JIS-B-061. Only a reference length is sampled from the roughness curve in the direction of its average line. The gap between the peak line and the trough line of the sampled portion is measured in the direction of the vertical magnification of the roughness curve. This trough line can correspond to the boundary 12, indicated by the broken line in FIG. 1, between the base section 11 and the fine protrusion-and-recess shaped section 2.

The average roughness and the maximum height of the fine protrusion-and-recess shaped section 2 can be determined by observing the cross section of the light-absorbing heat-shielding film 10 according to the embodiment with, for example, a scanning electron microscope.

Figure 1B:
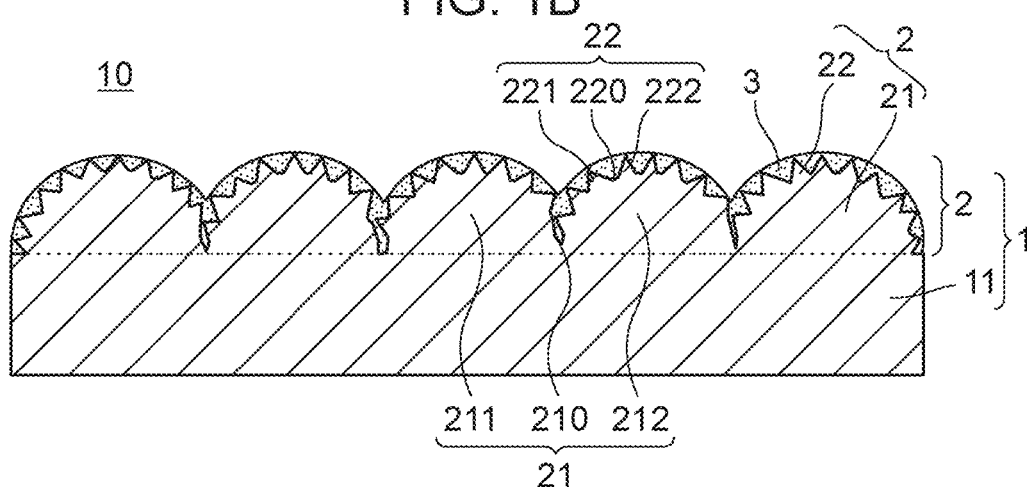
FIG. 1B is a schematic view illustrating a light-absorbing heat-shielding film according to an embodiment of the present invention.

As illustrated in FIG. 1B, the light-absorbing heat-shielding film according to another embodiment of the present invention may include a fine transparent metal oxide 3 in close contact with the fine protrusion-and-recess shaped section 2. In this specification, the fine metal oxide 3 may be referred to simply as a metal oxide. The fine metal oxide 3 is disposed between multiple protruding portions (for example, the protruding portions 221 and the protruding portions 222) included in the second protrusion-and-recess structure 22. That is, the recessed portions 220 between the protruding portions 221 and the protruding portions 222 are filled with the fine metal oxide 3.

Figure 1C:
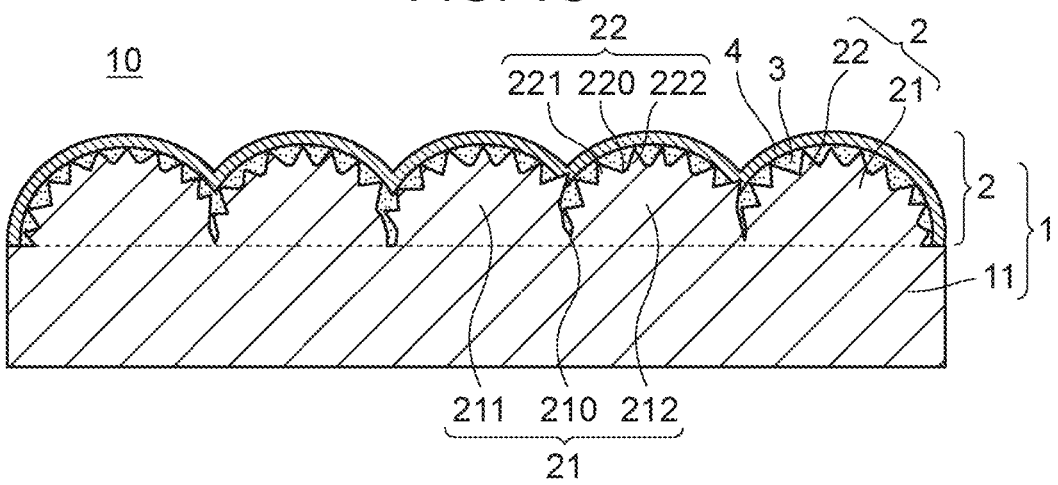
FIG. 1C is a schematic view illustrating a light-absorbing heat-shielding film according to an embodiment of the present invention.

As illustrated in FIG. 1C, the light-absorbing heat-shielding film according to another embodiment of the present invention may further include a transparent metal oxide layer 4 covering a surface of the fine metal oxide 3 that is not in contact with the fine protrusion-and-recess shaped section 2. The metal oxide layer 4 covers the fine protrusion-and-recess shaped section 2. The fine metal oxide 3 is disposed between the metal oxide layer 4 and the metal layer 1.

The close contact indicates that the metal oxide fills the spaces (recessed portions) surrounded by the fine protrusion-and-recess shaped section 2 and extends to the metal layer 1. In this specification, the metal oxide layer 4 may be referred to simply as a metal oxide.

The material of the fine metal oxide 3 is not particularly limited, but preferably contains aluminum oxide as a main component, and more preferably contains plate-like crystals containing aluminum oxide as a main component (hereinafter, referred to as plate-like crystals). The plate-like crystals containing aluminum oxide as a main component are formed of a crystal containing an oxide or a hydroxide of aluminum or a hydrate thereof as a main component, and are particularly preferably boehmite. The plate-like crystals containing aluminum oxide as a main component may be plate-like crystals composed only of aluminum oxide, or may be plate-like crystals containing a trace amount of, for example, zirconium, silicon, titanium, or zinc in the plate-like crystals of aluminum oxide.

The disposition of the fine metal oxide 3 can protect the fine protrusion-and-recess shaped section 2. When the fine metal oxide 3 has a plate-like structure of the plate-like crystals containing aluminum oxide as a main component, preferably, the plate-like crystals containing aluminum oxide as a main component are arranged in a direction perpendicular to the surface direction of the metal layer 1 and have continuously varying spatial occupancy.

The material of the metal oxide layer 4 is not particularly limited, but preferably contains an amorphous gel of aluminum oxide. The metal oxide layer 4 enhances the hardness of the surface of the light-absorbing heat-shielding film 10 according to the embodiment and decreases the light absorption properties. Thus, the thickness of the metal oxide layer 4 may be appropriately determined so as to satisfy the hardness and light absorption properties required.

The aluminum element, the silicon element, and the like in the fine protrusion-and-recess shaped section 2, the fine metal oxide 3, and the metal oxide layer 4 can be detected by, for example, surface measurement with a scanning electron microscope (SEM) or a transmission electron microscope (TEM). They can also be detected by, for example, energy-dispersive X-ray analysis (EDX) or X-ray photoelectron spectroscopy (XPS) at the time of cross-sectional observation. Similarly, metal elements, such as silver, copper, gold, aluminum, magnesium, tungsten, cobalt, zinc, nickel, and chromium, in the metal layer 1 can also be detected by, for example, surface measurement with a scanning electron microscope (SEM) or a transmission electron microscope (TEM). They can also be detected by, for example, energy-dispersive X-ray analysis (EDX) or X-ray photoelectron spectroscopy (XPS) at the time of cross-sectional observation. When the fine protrusion-and-recess shaped section 2, the fine metal oxide 3, or the metal oxide layer 4 is disposed, the proportion of the metal oxide, such as an aluminum element, relatively decreases from the surface (the metal oxide layer 4) toward the inside (the metal layer 1) in the direction perpendicular to the surface direction of the metal layer 1. The proportion of the metal element constituting the metal layer 1 and the fine protrusion-and-recess shaped section 2 relatively increases from the surface (the metal oxide layer 4) toward the inside (the metal layer 1). Ultimately, only the metal element is detected.

<Light-Absorbing Heat-Shielding Member>

Figure 2A:
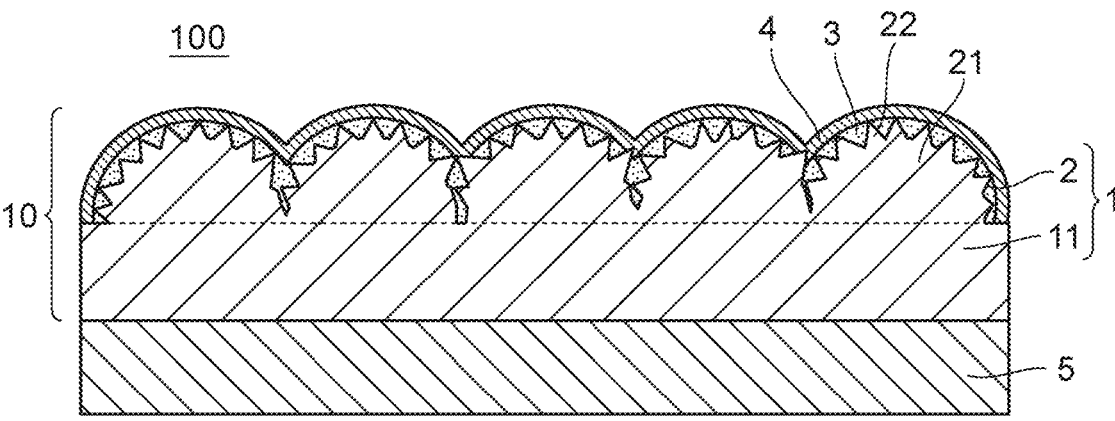
FIG. 2A is a schematic view illustrating a light-absorbing heat-shielding member according to an embodiment of the present invention.

As illustrated in FIG. 2A, a light-absorbing heat-shielding member according to an embodiment of the present invention is a light-absorbing heat-shielding member 100 in which a substrate 5 is disposed on a surface of the metal layer 1 of the light-absorbing heat-shielding film 10 according to the present embodiment opposite to the fine protrusion-and-recess shaped section 2. The light-absorbing heat-shielding member 100 includes the substrate 5 and the light-absorbing heat-shielding film 10 on the substrate 5. The shape of the substrate 5 may be any shape as long as it can be formed according to the purpose of use, and may be, for example, a formed product. Examples thereof include, but are not limited to, a flat plate shape, a film shape, and a sheet shape. Examples of the material of the substrate 5 include, but are not limited to, metals, glass, ceramic materials, wood, paper, and resins. Examples of resins include thermoplastic resins, such as polyester, triacetyl cellulose, cellulose acetate, poly(ethylene terephthalate), polypropylene, polystyrene, polycarbonate, and poly(methyl methacrylate). For example, ABS resins, poly(phenylene oxide), polyurethane, polyethylene, and poly(vinyl chloride) are also exemplified as thermoplastic resins. Further examples thereof include thermosetting resins, such as unsaturated polyester resins, phenolic resins, crosslinked polyurethane, crosslinked acrylic resins, and crosslinked saturated polyester resins.

Figure 2B:
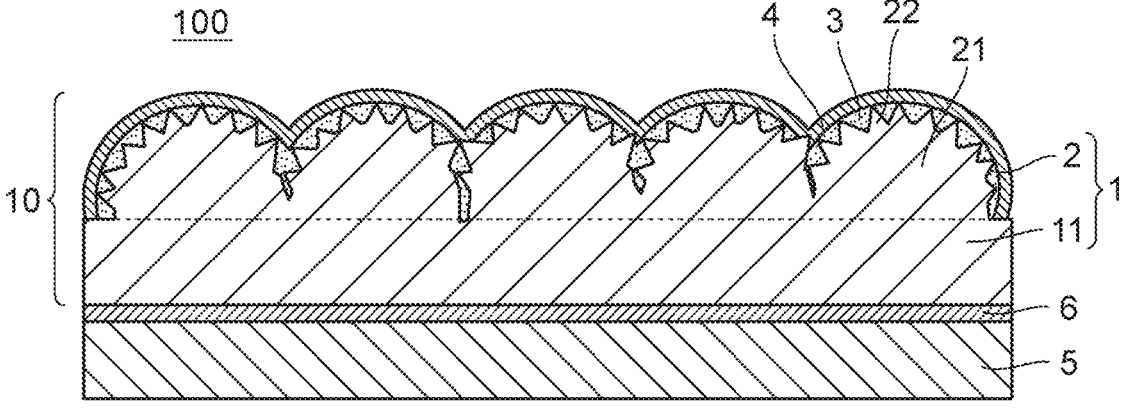
FIG. 2B is a schematic view illustrating a light-absorbing heat-shielding member according to an embodiment of the present invention.

As shown in FIG. 2B, in another embodiment of the present invention, the light-absorbing heat-shielding film 10 and the substrate 5 may be bonded to each other with an adhesive layer 6. The adhesive layer 6 included in the light-absorbing heat-shielding member 100 may be any layer as long as it can bond the light-absorbing heat-shielding film to the substrate 5. Examples thereof include a layer composed of a cured product of an adhesive resin (for example, epoxy resin); and double-sided tape.

FIGS. 2A and 2B each illustrate the light-absorbing heat-shielding member 100 including the light-absorbing heat-shielding film 10 illustrated in FIG. 1C. The light-absorbing heat-shielding member 100, however, may include the light-absorbing heat-shielding film 10 illustrated in FIG. 1A or 1B instead of the light-absorbing heat-shielding film 10 illustrated in FIG. 1C.

<Method for Producing Light-Absorbing Heat-Shielding Film and Light-Absorbing Heat-Shielding Member>

A method for producing the light-absorbing heat-shielding film 10 and the light-absorbing heat-shielding member 100 according to the embodiment will be described below with reference to FIG. 3.

Figure 3A:
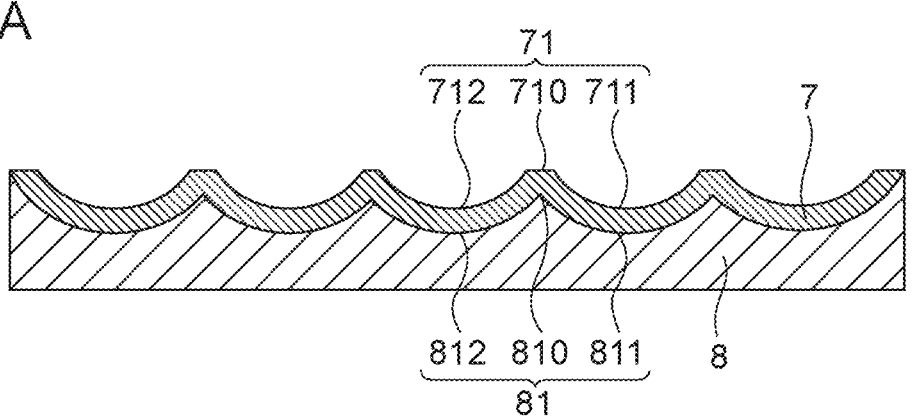
FIG. 3A is a process diagram illustrating a method for producing a light-absorbing heat-shielding member according to an embodiment of the present invention.
Figure 3B:
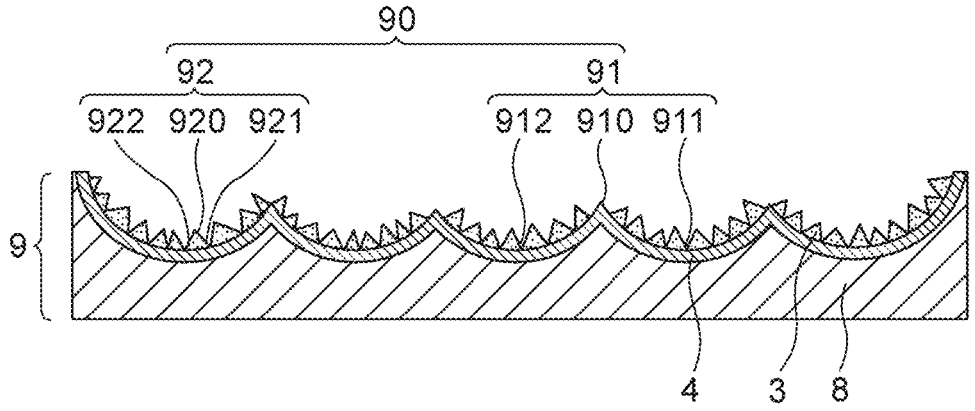
FIG. 3B is a process diagram illustrating a method for producing a light-absorbing heat-shielding member according to an embodiment of the present invention.

As illustrated in FIG. 3B, the production method according to the embodiment includes a step of providing a mold 9 having a fine protrusion-and-recess shape 92. The fine protrusion-and-recess shape 92 is included in the protrusion-and-recess shape 90. Thus, this step can also be said to be a step of providing the mold 9 having the protrusion-and-recess shape 90.

The mold 9 has a protrusion-and-recess structure 91. The protrusion-and-recess shape formed by the protrusion-and-recess structure 91 is included in the protrusion-and-recess shape 90. The protrusion-and-recess structure 91 includes multiple recessed portions (for example, recessed portions 911 and 912). Multiple protruding portions (for example, protruding portions 910) are disposed between the multiple recessed portions (for example, the recessed portions 911 and 912) of the protrusion-and-recess structure 91.

The fine protrusion-and-recess shape 92 includes multiple recessed portions (for example, recessed portions 921 and 922). Multiple protruding portions (for example, protruding portions 920) are disposed between the multiple recessed portions (for example, the recessed portions 921 and 922) of the fine protrusion-and-recess shape 92. The multiple recessed portions (for example, the recessed portions 921 and 922) included in the fine protrusion-and-recess shape 92 are disposed on the surface of each of the multiple recessed portions (for example, the recessed portions 911 and 912) included in the protrusion-and-recess structure 91.

The mold 9 may include a base body 8 and a metal oxide disposed on the base body 8. The metal oxide disposed on the base body 8 may include the fine metal oxide 3 and the metal oxide layer 4 that is disposed between the fine metal oxide 3 and the base body 8. Of the metal oxides disposed on the base body 8, the fine metal oxide 3 forms the fine protrusion-and-recess shape 92. That is, each of the multiple protruding portions (for example, the protruding portions 920) of the fine protrusion-and-recess shape 92 is each of the multiple portions of the fine metal oxide 3. The spaces between the multiple portions of the fine metal oxide 3 are the multiple recessed portions (for example, the recessed portions 921 and 922) of the fine protrusion-and-recess shape 92. As described above, the mold 9 has the fine protrusion-and-recess shape of the metal oxide. Regarding the fine protrusion-and-recess shape of the metal oxide, when attention is focused on the metal oxide, it means the fine metal oxide 3, and when attention is focused on the fine protrusion-and-recess shape, it means the fine protrusion-and-recess shape 92.

Figure 3C:
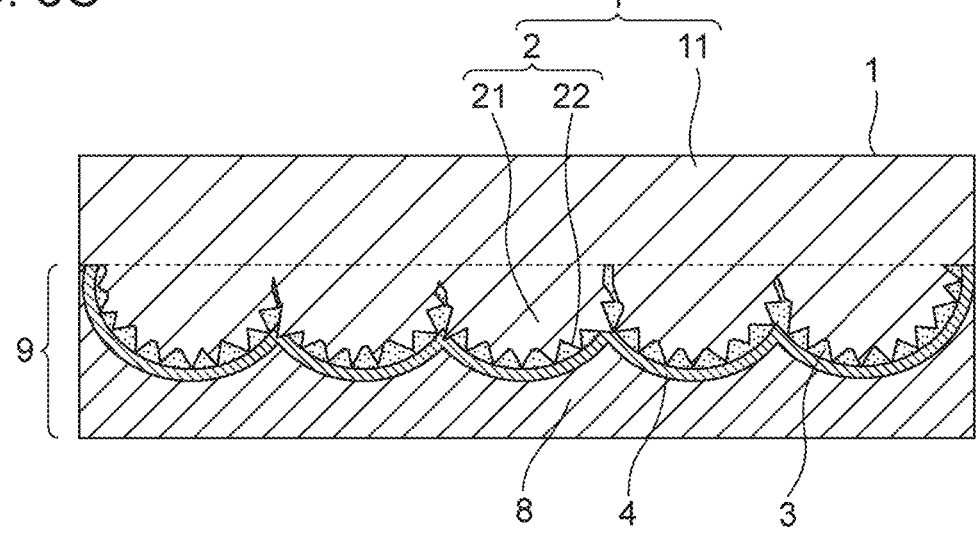
FIG. 3C is a process diagram illustrating a method for producing a light-absorbing heat-shielding member according to an embodiment of the present invention.

As illustrated in FIG. 3C, the production method according to the embodiment includes a step of forming, on the mold 9 having the fine protrusion-and-recess shape 92, the metal layer 1 to which the fine protrusion-and-recess shape 92 is transferred. The transfer of the fine protrusion-and-recess shape 92 results in the metal layer 1 having the second protrusion-and-recess structure 22 that reflects the fine protrusion-and-recess shape 92 of the mold 9. At this time, the metal layer 1 also has the first protrusion-and-recess structure 21 that reflects the protrusion-and-recess shape of the protrusion-and-recess structure 91 of the mold 9. Specifically, the multiple recessed portions (for example, the recessed portions 911 and 912) of the protrusion-and-recess structure 91 of the mold 9 are reflected in the multiple protruding portions (for example, the protruding portions 211 and 212) of the first protrusion-and-recess structure 21 illustrated in FIG. 1. The multiple recessed portions (for example, the recessed portions 921 and 922) of the fine protrusion-and-recess shape 92 of the mold 9 are reflected in the multiple protruding portions (for example, the protruding portions 221 and 222) of the second protrusion-and-recess structure 22 illustrated in FIG. 1.

Figure 3D:
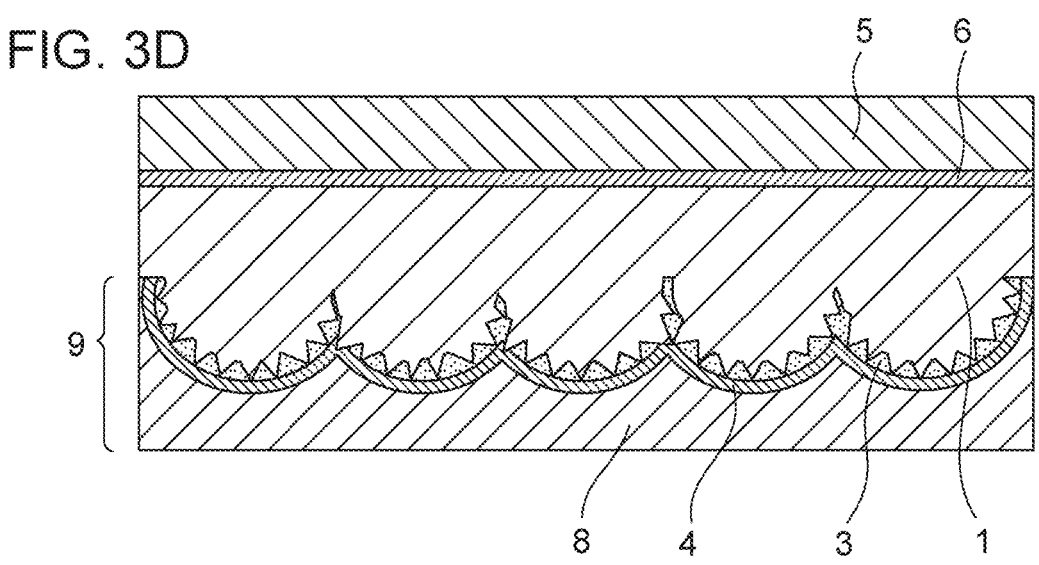
FIG. 3D is a process diagram illustrating a method for producing a light-absorbing heat-shielding member according to an embodiment of the present invention.

As illustrated in FIG. 3D, the production method according to the embodiment further includes a step of bonding the substrate 5 to a surface of the metal layer 1 of the light-absorbing heat-shielding film 10 opposite to the surface to which the fine protrusion-and-recess shape 92 is transferred.

Figure 3E:
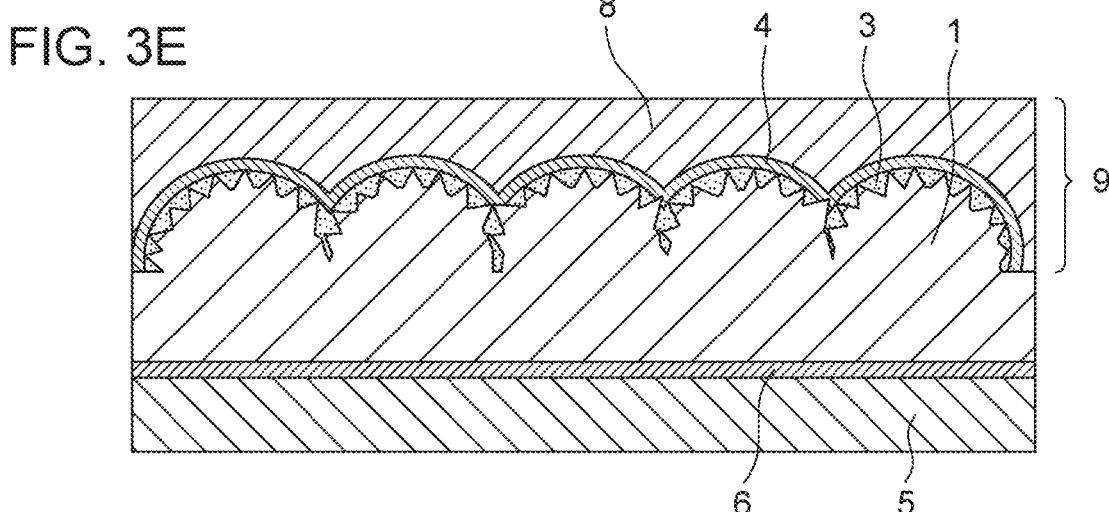
FIG. 3E is a process diagram illustrating a method for producing a light-absorbing heat-shielding member according to an embodiment of the present invention.
Figure 3F:
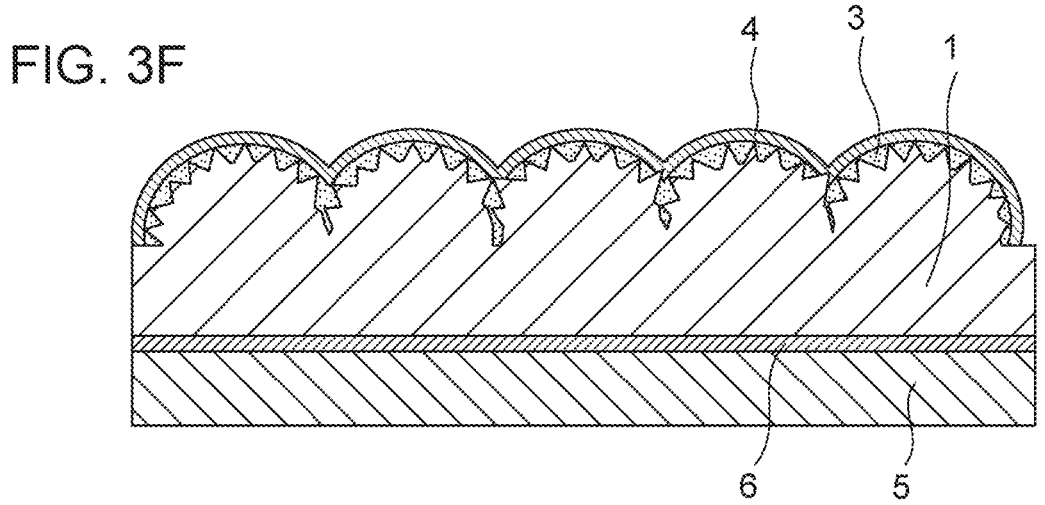
FIG. 3F is a process diagram illustrating a method for producing a light-absorbing heat-shielding member according to an embodiment of the present invention.
Figure 3G:
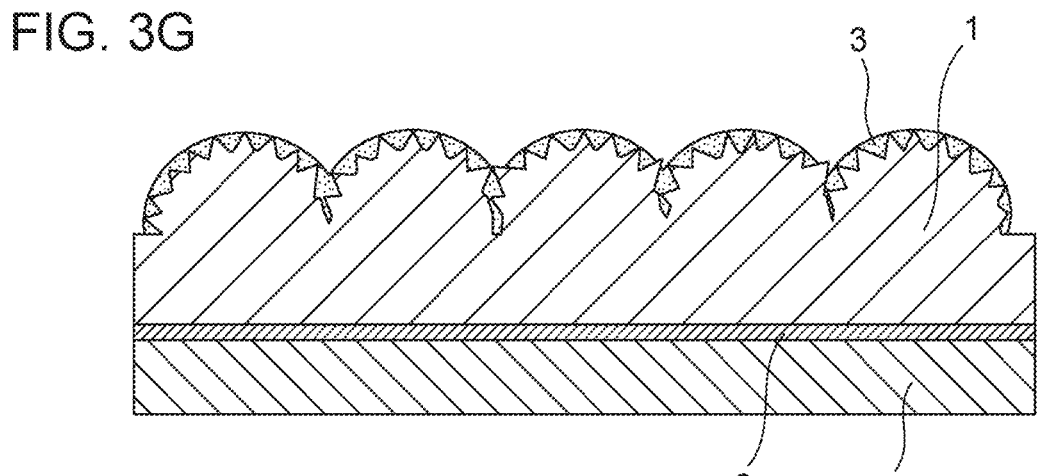
FIG. 3G is a process diagram illustrating a method for producing a light-absorbing heat-shielding member according to an embodiment of the present invention.
Figure 3H:
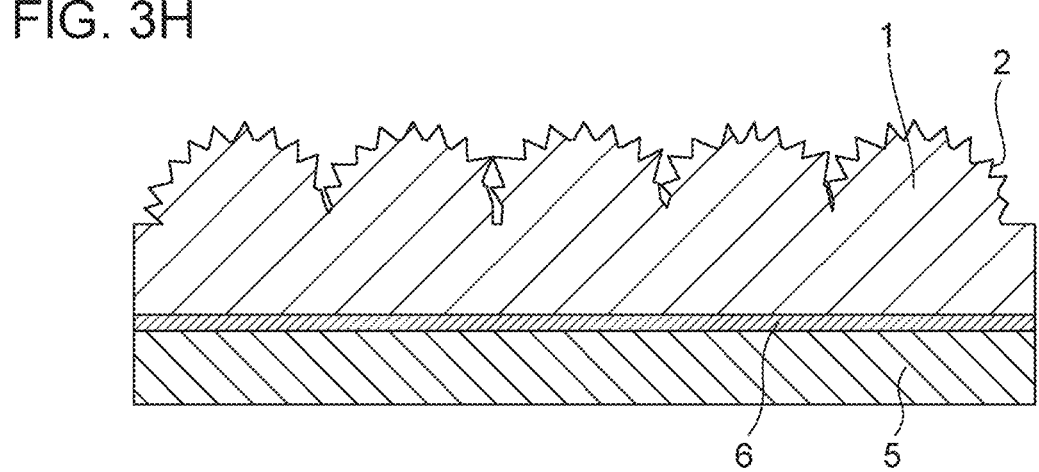
FIG. 3H is a process diagram illustrating a method for producing a light-absorbing heat-shielding member according to an embodiment of the present invention.

As illustrated in FIGS. 3F to 3H, the production method according to the embodiment includes a step of removing at least part of the mold 9 from the top of the metal layer 1. In the step illustrated in FIG. 3F, the base body 8 of the mold 9 is removed. In the step illustrated in FIG. 3G, the metal oxide layer 4 of the mold 9 is removed. In the step illustrated in FIG. 3H, the fine metal oxide 3 in the mold 9 is removed. In the step illustrated in FIG. 3H, the entire mold 9 is removed. When the base body 8 of the mold 9 is composed of a light-transmitting material, such as glass, the metal layer 1 can be used as a light-absorbing heat-shielding film without removing the base body 8. That is, the light-absorbing heat-shielding members 100 having the structures illustrated in FIGS. 3D and 3E can also be used.

Each step illustrated in FIGS. 3A to 3H may be part of the method for producing the light-absorbing heat-shielding film 10 or may be part of the method for producing the light-absorbing heat-shielding member 100.

The method for producing the light-absorbing heat-shielding film 10 according to the embodiment includes a first step of forming the fine protrusion-and-recess shape of a metal oxide on the base body 8, and a second step of forming the metal layer 1 on the fine protrusion-and-recess shape of the metal oxide. The method for producing the light-absorbing heat-shielding member according to the embodiment further includes a step of bonding the substrate 5 to a surface of the metal layer 1 of the light-absorbing heat-shielding film 10 opposite to the surface in contact with the fine protrusion-and-recess shape of the metal oxide.

The first structure (first protrusion-and-recess structure 21) of the fine hierarchical structure in the light-absorbing heat-shielding film 10 reflects the roughness structure size of the base material used for the mold 9. The second structure (second protrusion-and-recess structure 22) reflects the size of the fine protrusion-and-recess shape 92 of the metal oxide.

First Step: Step of Forming Fine Protrusion-and-Recess Shape of Metal Oxide

In the first step, the fine protrusion-and-recess shape of the metal oxide to be the mold 9 is formed.

A base material is provided. Hereinafter, the base material (substrate) is referred to as the base body 8 in order to distinguish the base material from the substrate 5. The base body 8, however, is synonymous with the base material or the substrate. The base body 8 used may be one having a protrusion-and-recess structure 81 of the order of micrometers on the surface of the base body 8. Examples thereof include, but are not limited to, ground glass roughened with an abrasive or an etchant, such as an acid or alkali, and the base body 8 processed with, for example, an electron beam. The base body 8 may be formed by forming a structure of the order of micrometers on a film applied to a surface.

As illustrated in FIG. 3A, the protrusion-and-recess structure 81 of the base body 8 has multiple recessed portions (for example, recessed portions 811 and 812) and multiple protruding portions (for example, protruding portions 810 between the recessed portions 811 and 812) between the multiple recessed portions (for example, the recessed portions 811 and 812).

As illustrated in FIG. 3A, a film 7 containing aluminum is formed on the base body 8 having the protrusion-and-recess structure 81 of the order of micrometers. The film 7 is formed along the protrusion-and-recess structure 81 of the base body 8 and thus has a protrusion-and-recess structure 71 that reflects the protrusion-and-recess structure 81 of the base body 8. The protrusion-and-recess structure 71 of the film 7 has multiple recessed portions (for example, recessed portions 711 and 712) and multiple protruding portions (for example, protruding portions 710 between the recessed portions 711 and 712) between the multiple recessed portions (for example, the recessed portions 711 and 712). The multiple recessed portions (for example, the recessed portions 711 and 712) of the film 7 reflect the multiple recessed portions (for example, the recessed portions 811 and 812) of the base body 8. The multiple protruding portions (for example, the protruding portions 710) of the film 7 reflect the multiple protruding portions (for example, the protruding portions 810) of the base body 8.

As illustrated in FIG. 3B, the fine metal oxide 3 having the fine protrusion-and-recess shape 92 is formed on the base body 8. The fine metal oxide 3 having the fine protrusion-and-recess shape 92 is formed by modifying the film 7. Accordingly, it is disposed along the multiple recessed portions (for example, the recessed portions 711 and 712) of the film 7 and the multiple protruding portions (for example, the protruding portions 710) of the film 7. Thus, the fine metal oxide 3 having the fine protrusion-and-recess shape 92 also constitutes the protrusion-and-recess structure 91 of the protrusion-and-recess shape 90. As illustrated in FIG. 3B, the metal oxide layer 4 originating from the film 7 can be formed between the base body 8 and the fine metal oxide 3 having the fine protrusion-and-recess shape 92.

The material of the fine protrusion-and-recess shape of the metal oxide is not particularly limited, but preferably contains aluminum oxide as a main component. The fine protrusion-and-recess shape can be formed by a known vapor phase method, such as chemical vapor deposition (CVD) or physical vapor deposition (PVD), or a sol-gel liquid-phase method. By such a method, it is possible to form the fine protrusion-and-recess shape of the metal oxide containing plate-like crystals that contain aluminum oxide as a main component. Among them, a method in which an aluminum-containing film is treated with hot water to grow aluminum oxide plate crystals is preferred.

Examples of the aluminum-containing film 7 include an aluminum oxide gel film formed by applying a sol-gel coating solution containing an aluminum compound, and a metal aluminum-containing film formed by dry film formation, such as vacuum deposition or sputtering. The fine protrusion-and-recess shape of the metal oxide is preferably formed using the aluminum oxide gel film in terms of ease of adjustment of the reactivity and the height of the fine protrusion-and-recess shape of the metal oxide.

As a raw material of the aluminum oxide gel film, an aluminum compound, such as an aluminum alkoxide, an aluminum halide, or an aluminum salt, can be used. From the viewpoint of film formability, it is preferable to use an aluminum alkoxide.

Examples of the aluminum compound include aluminum alkoxides, such as aluminum ethoxide, aluminum isopropoxide, aluminum n-butoxide, aluminum sec-butoxide, and aluminum tert-butoxide. Further examples thereof include oligomers of those aluminum alkoxides, aluminum halides, such as aluminum chloride, aluminum salts, such as aluminum nitrate, aluminum acetate, aluminum phosphate, and aluminum sulfate, aluminum acetylacetonate, and aluminum hydroxide.

The aluminum oxide gel film may contain another compound. Examples of another compound include alkoxides, halides, and salts of zirconium, silicon, titanium, and zinc, and combinations thereof. When the aluminum oxide gel film contains another compound, the height of the fine protrusion-and-recess shape of the metal oxide to be formed can be increased as compared with the case where the aluminum oxide gel film does not contain another compound.

The aluminum oxide gel film is formed on the base body 8 by applying a sol-gel coating solution containing the aluminum compound, as described below. The sol-gel coating solution is prepared by dissolving the aluminum compound in an organic solvent. The amount of the organic solvent with respect to the aluminum compound is preferably about 20 times in terms of the mole ratio.

Examples of the organic solvent that can be used include alcohols, carboxylic acids, aliphatic hydrocarbons, alicyclic hydrocarbons, aromatic hydrocarbons, esters, ketones, ethers, and mixtures of these solvents. Examples of alcohols include methanol, ethanol, 2-propanol, butanol, 2-methoxy-ethanol, 2-ethoxyethanol, 1-methoxy-2-propanol, and 1-ethoxy-2-propanol. Further examples thereof include 1-propoxy-2-propanol, 4-methyl-2-pentanol, 2-ethylbutanol, 3-methoxy-3-methylbutanol, ethylene glycol, diethylene glycol, and glycerol. Examples of carboxylic acids include n-butyric acid, α-methylbutyric acid, isovaleric acid, 2-ethylbutyric acid, 2,2-dimethylbutyric acid, 3,3-dimethylbutyric acid, 2,3-dimethylbutyric acid, 3-methylpentanoic acid, and 4-methylpentanoic acid. Further examples thereof include 2-ethylpentanoic acid, 3-ethylpentanoic acid, 2,2-dimethylpentanoic acid, 3,3-dimethylpentanoic acid, 2,3-dimethylpentanoic acid, 2-ethylhexanoic acid, and 3-ethylhexanoic acid. Examples of aliphatic or alicyclic hydrocarbons include n-hexane, n-octane, cyclohexane, cyclopentane, and cyclooctane. Examples of aromatic hydrocarbons include toluene, xylene, and ethylbenzene. Examples of esters include ethyl formate, ethyl acetate, n-butyl acetate, ethylene glycol monomethyl ether acetate, ethylene glycol monoethyl ether acetate, and ethylene glycol monobutyl ether acetate. Examples of ketones include acetone, methyl ethyl ketone, methyl isobutyl ketone, and cyclohexanone. Examples of ethers include dimethoxyethane, tetrahydrofuran, dioxane, and diisopropyl ether. Among these, an alcohol is preferably used from the viewpoint of the stability of the sol-gel coating solution.

When the aluminum alkoxide is used as the aluminum compound, its high reactivity to water may cause rapid hydrolysis of the aluminum alkoxide due to moisture in air or the addition of water, thereby resulting in cloudiness of the sol-gel coating solution and precipitation. To prevent these problems, a stabilizer is preferably added to the sol-gel coating solution to stabilize the solution. Examples of the stabilizer that can be used include β-diketone compounds, β-ketoester compounds, and alkanolamines. Examples of β-diketone compounds include acetylacetone, trifluoroacetylacetone, hexafluoroacetylacetone, benzoylacetone, 3-methyl-2,4-pentanedione, and 3-ethyl-2,4-pentanedione. Examples of β-ketoester compounds include methyl acetoacetate, ethyl acetoacetate, butyl acetoacetate, hexyl acetoacetate, allyl acetoacetate, benzyl acetoacetate, and isopropyl acetoacetate. Further examples thereof include 2-methoxyethyl acetoacetate, sec-butyl acetoacetate, tert-butyl acetoacetate, and isobutyl acetoacetate. Examples of alkanolamines include monoethanolamine, diethanolamine, and triethanolamine. The amount of stabilizer with respect to the aluminum alkoxide is preferably about one time in terms of the mole ratio.

A catalyst may be used to promote the hydrolysis reaction of the aluminum alkoxide. Examples of the catalyst include nitric acid, hydrochloric acid, sulfuric acid, phosphoric acid, acetic acid, and ammonia.

If necessary, a water-soluble organic polymer compound may be added to the aluminum oxide gel film. The water-soluble organic polymer compound is easily eluted from the aluminum oxide gel film by immersion in hot water. This increases the reaction surface area between the aluminum compound and hot water, thereby enabling the formation of the fine protrusion-and-recess shape at a low temperature in a short period of time. For example, the height of the fine protrusion-and-recess shape formed can be controlled by changing the type and molecular weight of the organic polymer added. As the organic polymer, polyether glycols, such as polyethylene glycol and polypropylene glycol, are preferred because they are easily eluted from the aluminum oxide gel film by immersion in hot water. The amount of polyether glycol with respect to the weight of the aluminum compound in the aluminum oxide gel film is preferably in the range of 0.1 to 10 times in terms of the weight ratio.

A method for forming the fine protrusion-and-recess shape of the metal oxide will be described in detail with reference to FIGS. 3A and 3B.

In the step illustrated in FIG. 3A, an aluminum compound and, if necessary, another compound, a stabilizer, and a water-soluble organic polymer compound are dissolved or suspended in an organic solvent to prepare a sol-gel coating solution. This sol-gel coating solution is applied onto the base body 8 and dried to form an aluminum oxide gel film as the aluminum-containing film 7. Alternatively, a metal aluminum-containing film as the aluminum-containing film 7 is formed on the base body 8 by dry film formation, such as vacuum deposition or sputtering. The material of the base body 8 is not particularly limited, and various materials, such as glass, plastic, and metal, can be used. When the aluminum oxide gel film is formed using a sol-gel coating solution that contains no stabilizer, the atmosphere in which the coating is performed is preferably an inert-gas atmosphere, such as dry air or dry nitrogen. The relative humidity of the dry atmosphere is preferably 30% or less. As a solution application method for forming the aluminum oxide gel film, for example, known application means, such as a dipping method, a spin coating method, a spraying method, a printing method, a flow coating method, and a combination thereof, can be appropriately employed. The thickness can be controlled by, for example, changing the withdrawal speed in the dipping method or the substrate rotation speed in the spin coating method, and by changing the concentration of the sol-gel coating solution. The drying may be performed at room temperature for about 30 minutes. It is also possible to perform drying or heat treatment at a higher temperature, as necessary. A higher heat-treatment temperature results in the formation of the stabler fine protrusion-and-recess shape 92 of the fine metal oxide 3 in the following immersion treatment. The suitable thickness of the aluminum-containing film 7 is 100 nm or more and 600 nm or less, preferably 100 nm or more and 300 nm or less, more preferably 100 nm or more and 200 nm or less.

In the step illustrated in FIG. 3B, the aluminum-containing film 7 is immersed in hot water to form aluminum oxide having a fine protrusion-and-recess shape. By immersing the aluminum oxide gel film in hot water, the surface layer of the aluminum oxide gel film is subjected to deflocculation or the like. Although some components are eluted, plate-like crystals containing aluminum oxide as a main component are precipitated, grown, and formed on the surface layer of the aluminum oxide gel film because of differences in solubility of various hydroxides in hot water. In addition, the metal oxide layer 4 containing an amorphous gel of aluminum oxide, which is the above-described metal oxide layer 4 (see FIG. 1), is formed on the base body 8. Thereby, the metal oxide layer 4 and the fine protrusion-and-recess shape 92 of the fine metal oxide 3 described above (see FIG. 1) are formed. When a metal aluminum-containing film is used in place of the aluminum oxide gel film, aluminum reacts with hot water and is oxidized into aluminum oxide. Thereafter, as in the case of using the aluminum oxide gel film, the fine protrusion-and-recess shape 92 of the fine metal oxide 3 is formed on the surface of the metal aluminum-containing film. Thus, when the material of the base body 8 mainly contains aluminum or aluminum oxide, the formation of the aluminum-containing film 7 on the base body 8 can be omitted. The temperature of the hot water is preferably 40° C. or higher and lower than 100° C. The immersion treatment time is preferably about 5 minutes to about 24 hours. In the immersion treatment of an aluminum oxide gel film to which a compound other than the aluminum oxide component is added, aluminum oxide is crystallized into plate-like crystals using the differences in solubility of the components in hot water. Unlike the immersion treatment of an aluminum oxide gel film containing a single component of aluminum oxide, the size of the plate-like crystals can thus be controlled over a wide range by changing the composition of the inorganic components. Adjusting the thickness of the aluminum-containing film 7 can also be used to adjust the height of the metal oxide layer 4 and the fine protrusion-and-recess shape 92 of the fine metal oxide 3. The average height of the fine protrusion-and-recess shape 92 of the fine metal oxide 3 is preferably 100 nm or more and 1,000 nm or less, more preferably 100 nm or more and 500 nm or less. Accordingly, it is possible to control the fine protrusions and recesses formed by the plate-like crystals over the wide range described above.

Second Step: Step of Forming Metal Layer 1

In the second step, the metal layer 1 is formed on the fine protrusion-and-recess shape of the metal oxide, thereby forming the metal layer 1 having the fine protrusion-and-recess shaped section 2 to which the fine protrusion-and-recess shape 92 of the mold 9 is transferred. The step of forming the metal layer 1 on the fine protrusion-and-recess shape 92 of the metal oxide will be described below with reference to FIG. 3C. As a method for forming the metal layer 1, metal plating treatment is preferred, and electroless plating treatment is more preferred. In the electroless plating treatment, activation is performed by applying an aqueous solution in which a palladium compound such as palladium chloride, a gold compound such as gold chloride, a silver compound such as silver chloride, a tin compound such as tin chloride, or the like is dissolved, to the fine protrusion-and-recess shape 92 of the metal oxide. The activation may be performed by immersing the fine protrusion-and-recess shape 92 of the metal oxide together with the base body 8 in the aqueous solution in which the palladium compound is dissolved. The metal layer 1 is then deposited on the fine protrusion-and-recess shape 92 of the metal oxide using an electroless plating solution. The metal ions in the electroless plating solution correspond to the metal layer of the light-absorbing heat-shielding film according to the embodiment. An electroless plating solution containing nickel ions, chromium ions, or zinc ions is preferred. A nickel plating solution containing nickel ions is particularly preferred. The nickel plating solution may contain a phosphorus component or a boron component in addition to the nickel component. Examples of a commercially available nickel plating solution include Top Nicoron series available from Okuno Chemical Industries Co., Ltd. The temperature of the plating solution in the electroless plating treatment is preferably 30° C. or higher and 98° C. or lower, more preferably 50° C. or higher and 90° C. or lower. The time for performing the electroless plating treatment can be adjusted in accordance with the thickness of the metal layer to be formed, and is usually 30 seconds to 1 hour. In this way, the metal layer 1 is formed so as to fill the gap of the fine protrusion-and-recess shape, so that the metal layer 1 including the fine protrusion-and-recess shaped section 2 to which the fine protrusion-and-recess shape 92 of the metal oxide is transferred is formed. At this time, a section located above (on the side opposite to the mold 9) the vertices of the protruding portions (for example, the protruding portions 910) of the protrusion-and-recess structure 91 is the base section 11. A section located below (on the side adjacent to the mold 9) the vertices of the protruding portions (for example, the protruding portions 910) of the protrusion-and-recess structure 91 is the fine protrusion-and-recess shaped section 2. That is, the metal layer 1 including the base section 11, the first protrusion-and-recess structure 21 (first structure), and the second protrusion-and-recess structure 22 (second structure) is formed. The metal layer 1 including the base section 11, the first protrusion-and-recess structure 21 (first structure), and the second protrusion-and-recess structure 22 (second structure) is preferably a layer of plating.

The main components of the metal materials of the base section 11, the first protrusion-and-recess structure 21, and the second protrusion-and-recess structure 22 included in the metal layer 1 are preferably identical.

The electroless plating treatment is preferably performed in such a manner that the metal layer 1 including the fine protrusion-and-recess shaped section 2 has a thickness of 200 nm or more and 15,000 nm or less. The metal layer 1 is formed so as to cover the vertices of the protruding portions (for example, the protruding portions 910) of the protrusion-and-recess structure 91. This portion serves as the base section 11. Thus, the thickness of the base section 11 can be 200 nm or more and 15,000 nm or less. The average height of the second protrusion-and-recess structure 22 in the fine protrusion-and-recess shaped section 2 corresponds to the average height of the fine protrusion-and-recess shape 92 of the metal oxide, and is 100 nm or more and 1,000 nm or less. When the metal layer 1 including the fine protrusion-and-recess shaped section 2 has a thickness of 200 nm or more, the light-absorbing heat-shielding film according to the embodiment exhibits excellent light absorption and heat shielding properties.

After the above-described electroless plating treatment is performed, in order to increase the thickness of the metal layer 1, an electroplating treatment may be performed on the surface of the metal layer 1 opposite to the surface on which the fine protrusion-and-recess shaped section 2 is disposed. For the electroplating treatment, a known electroplating solution can be used. For example, an electroplating solution containing nickel ions, iron ions, copper ions, or the like as metal ions can be used. When the electroplating treatment is performed using the same metal as the metal of the metal layer 1, the thickness of the metal layer can be increased by the electroplating treatment. When the electroplating treatment is performed on the metal layer 1 using a metal different from the metal of the metal layer 1, the metal layer formed by the electroplating treatment serves as the substrate 5. In addition to the inorganic salt serving as the raw material of the metal ions, a conductive salt, a salt for adjusting a counter ion, a carboxylic acid-based additive for improving the uniformity of a film of plating, a brightener, and the like may be added to the electroplating solution, as needed. In the electroplating step, the thickness of the metal layer 1 can be set to a desired thickness by adjusting the solution temperature of the electroplating solution, the current density, and the plating time. If necessary, before the electroplating step, a surface of metal layer 1 opposite to the surface on which the fine protrusion-and-recess shaped section 2 is disposed may be subjected to activation treatment with an aqueous solution containing an acid or the like. To improve the quality of the film formed by the electroplating treatment step, a step of removing foreign matter in the electroplating solution may be provided in addition to a step of stirring the electroplating solution during the electroplating treatment.

Third Step: Step of Bonding Substrate

In the production of the light-absorbing heat-shielding member according to the embodiment, as illustrated in FIG. 3D, the substrate 5 is bonded to a surface of the metal layer 1 opposite to the surface on which the fine protrusion-and-recess shaped section 2 is disposed. As the shape and material of the substrate 5, those described above can be used. When the material of the substrate 5 is a metal, a metal serving as the substrate 5 may be further stacked on the surface of the metal layer 1 opposite to the surface on which the fine protrusion-and-recess shaped section 2 is disposed. Regarding a method for stacking the metal, the metal may be stacked by the above-described electroplating treatment, or may be stacked by physical vapor deposition, such as sputtering. When the material of the substrate 5 is a resin, the substrate may be formed by depositing a resin to be the substrate 5 on a surface of the metal layer 1 opposite to the fine protrusion-and-recess shape 92 of the metal oxide and then curing the resin. The substrate 5 may be bonded to the metal layer 1 with the adhesive layer 6. The adhesive used for the adhesive layer 6 is not particularly limited as long as it is a material that firmly bonds the substrate 5 and the metal layer 1 together.

Fourth Step: Etching Step

As illustrated in FIG. 3E to 3H, the etching step will be described in detail by taking as an example a light-absorbing heat-shielding member including the substrate 5 and the adhesive layer 6. The same applies to a light-absorbing heat-shielding member including only the substrate 5 without the adhesive layer 6 and a light-absorbing heat-shielding film including neither the substrate 5 nor the adhesive layer 6. FIG. 3E is an upside-down view of the light-absorbing heat-shielding member illustrated in FIG. 3D.

To obtain the light-absorbing heat-shielding member according to the embodiment, the base body 8 is removed, as illustrated in FIG. 3F. After the removal of the base body 8, the light-absorbing heat-shielding member includes the metal aluminum-containing film 7 or the metal oxide layer 4 on the surface thereof. In the case of the metal aluminum-containing film, the metal aluminum reflects visible light; thus, the metal aluminum-containing film needs to be removed by etching, as illustrated in FIG. 3G. In the case of the metal oxide layer 4 (a layer containing the amorphous gel of aluminum oxide), the layer containing the amorphous gel of aluminum oxide serves as the metal oxide layer 4 of the light-absorbing heat-shielding member. Thus, the layer containing the amorphous gel of aluminum oxide may be removed by etching so as to satisfy the surface hardness and light absorption properties required. As an etching method, wet etching is preferred in which a metal aluminum-containing film or the metal oxide layer 4 is dissolved using a solution of acid or alkali. Examples of the acid include hydrochloric acid, nitric acid, and sulfuric acid. Examples of the alkali include sodium hydroxide and potassium hydroxide. From the viewpoint of work efficiency, an etching method using an alkali solution is more preferred. The etchant concentration is preferably in the range of several percent to several tens of percent, and the etching time is preferably in the range of several hours to several days. As illustrated in FIG. 3H, the fine metal oxide 3 of the fine protrusion-and-recess shape 92 may also be removed by etching. Thereby, the metal layer 1 in which the metal oxide is attached to the fine protrusion-and-recess shaped section 2 (in other words, the light-absorbing heat-shielding film 10 containing the metal oxide attached to the fine protrusion-and-recess shaped section 2) can be formed. The light-absorbing heat-shielding member in which the metal layer 1 including the fine protrusion-and-recess shaped section 2 on the outermost surface is bonded to the substrate 5 with the adhesive layer 6 provided therebetween achieves particularly excellent light absorption properties. In addition, the metal layer 1 in which the metal oxide is attached to the fine protrusion-and-recess shaped section 2 also has outstanding light absorption properties and can also have improved strength of the fine protrusion-and-recess shaped section 2; thus, the member is also excellent in durability and environmental resistance.

The residue of the metal oxide, such as aluminum oxide, after etching (the metal oxide attached to the fine protrusion-and-recess shaped section 2) can be detected by, for example, EDX or XPS measurement during surface or cross-sectional observation with a SEM or TEM.

As described above, the degree of the etching treatment may be adjusted in view of the desired balance between the light absorption performance and the surface hardness of the light-absorbing heat-shielding member or the light-absorbing heat-shielding film. Alternatively, the etching step, which is the present step, may be performed before the step of bonding the substrate 5, which is the third step, is performed, and then the substrate 5 may be bonded.

The light-absorbing heat-shielding member and the light-absorbing heat-shielding film according to the embodiment obtained as described above include the metal layer 1 including the fine protrusion-and-recess shaped section 2 and thus absorb visible light, thereby resulting in low reflectance in the visible light region and low far-infrared radiation. This results in high reflectance in the far-infrared region and can achieve excellent light absorption and heat shielding properties.

The light-absorbing heat-shielding film 10 according to the embodiment can be disposed on the surface of any of various members or articles to produce the light-absorbing heat-shielding member 100. The light-absorbing heat-shielding film 10 according to the embodiment is preferably used for a heat-generating element as a member or an article. Examples of the article including such a heat-generating element include batteries, engines, motors, and vehicles. Examples of engines include reciprocating engines, rotary engines, diesel engines, gas turbine engines, jet engines, and rocket engines. Examples of motors include DC motors, AC motors, PM motors, brush motors, stepping motors, induction motors, servo motors, ultrasonic motors, in-wheel motors, and linear motors. A transport apparatus including at least one of an engine and a motor may include the light-absorbing heat-shielding film 10. The transport apparatus including at least one of an engine and a motor is not limited to any of various vehicles, such as automobiles and electric trains. Examples thereof include ships, aircrafts, such as drones, and various robots, such as automated guided vehicles (AGVs). The transport apparatus is not limited to a transport apparatus for passenger transportation, but may be a transport apparatus for cargo transportation. An unattended operation may be used by remote control or autonomous guidance. A hybrid vehicle is a vehicle including a battery, an engine, and a motor. The light-absorbing heat-shielding film 10 and the light-absorbing heat-shielding member 100 according to the embodiment can be used for stray light-preventing heat-shielding components inside optical devices or for interior and exterior components of space related devices, such as artificial satellites, and can also be used for exterior films, solar collectors, and so forth. In addition, the light-absorbing heat-shielding film according to the embodiment can also be used for clothes and so forth. Furthermore, the light-absorbing heat-shielding film according to the embodiment may be used as a heat-shielding decorative film. For example, the light-absorbing heat-shielding film according to the embodiment can be provided as a heat-shielding decorative film on any of surfaces of vehicle interiors, mobile devices, home electric appliances, parasols, and tent goods. When the light-absorbing heat-shielding film according to the embodiment is provided on a surface of a member or an article, any of various adhesives can be used. The light-absorbing heat-shielding film according to the embodiment can be provided on any of surfaces of members and articles in accordance with the purpose of use. The surfaces of members and articles are not limited to smooth surfaces, and may have two-dimensional or three-dimensional curved surfaces.

In a conventional infrared thermal imaging camera, when various members or articles are present in an angle of view, it has been difficult to identify a member or an article to be detected. A member or an article including the light-absorbing heat-shielding film according to the embodiment on the outermost surface has a difference in detection temperature as compared with a member or an article not including the light-absorbing heat-shielding film; thus, the use of the light-absorbing heat-shielding film according to the embodiment enables clear identification of the member or article. Typically, an infrared thermal imaging camera has a detection temperature error range of 2° C. Thus, the detection temperature at a surface of the light-absorbing heat-shielding film opposite to the surface in contact with a member or an article may be at least 3° C. lower than the detection temperature at a portion of the member or article where the light-absorbing heat-shielding film is not disposed. Here, when the member or article is a heat-generating element, the identification can be more clearly performed.

EXAMPLES

Hereinafter, the embodiment will be described in more detail with reference to examples.

However, the embodiment is not limited to the following examples.

A lens reflectance measuring device (trade name: USPM-RU III, available from Olympus Corporation) was used for the reflectance spectrum measurement in the visible light region in Examples.

A Fourier transform infrared spectrophotometer (FT/IR-6600, available from JASCO Corporation) was used for the reflectance spectrum measurement in the infrared region in Examples.

Example 1

Production of Light-Absorbing Heat-Shielding Member

Aluminum sec-butoxide (hereinafter, also referred to as "Al(O-sec-Bu)$_3$") and ethyl acetoacetate (hereinafter, also referred to as "EtOAcAc") were dissolved in 2-propanol (hereinafter, also referred to as "IPA") and stirred at room temperature for about 3 hours to prepare an aluminum oxide sol solution. The mole ratio of the components in the aluminum oxide sol solution was Al(O-sec-Bu)$_3$:EtOAcAc: IPA=1:1:20. A 0.01 M dilute hydrochloric acid was added to the aluminum oxide sol solution in such a manner that the amount of hydrochloric acid added was two times with respect to Al(O-sec-Bu)$_3$ in terms of the mole ratio, and the mixture was refluxed for about 6 hours to prepare a sol-gel coating solution. The sol-gel coating solution was applied onto a quartz glass substrate (#1200), serving as a base material, having a ground surface by a spin coating method to form a coating film. Thereafter, the coating film was heat-treated at 100° C. for 1 hour to provide a transparent aluminum oxide gel film. The aluminum oxide gel film was immersed in hot water at 80° C. for 30 minutes and then dried at 100° C. for 10 minutes to form an aluminum oxide layer having a fine protrusion-and-recess shape.

An aqueous palladium chloride solution was applied onto the aluminum oxide layer having the fine protrusion-and-recess shape by a spin coating method, and then dried at 100° C. Thereafter, the substrate was subjected to immersion treatment in a nickel-phosphorus plating solution (phosphorus content: about 1 to 2 wt %) set at 80° C. for 20 minutes to form a nickel layer, serving as a metal layer, including a fine protrusion-and-recess shaped section and a base section below it. After that, the light-absorbing heat-shielding film was peeled off from the quartz glass substrate and, as an etching step, subjected to etching treatment at room temperature for 50 hours using a 3 M aqueous sodium hydroxide solution to produce a light-absorbing heat-shielding film.

The overall thickness of the resulting light-absorbing heat-shielding film was about 10 μm.

Observation of Cross-Sectional Shape

Figure 4:
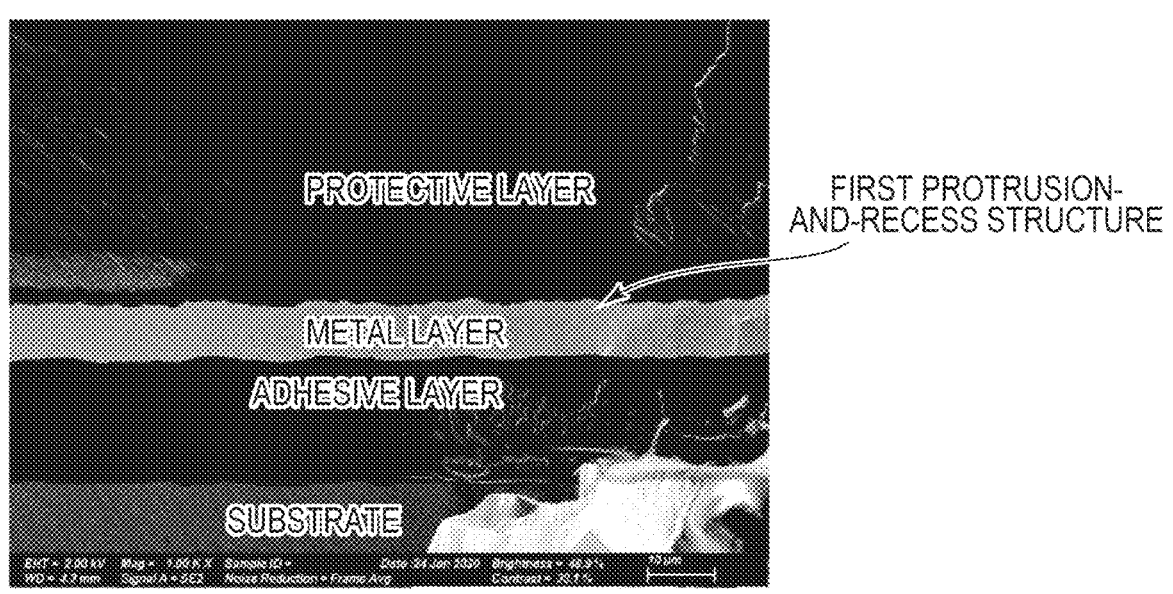
FIG. 4 is an electron microscopic view of a cross section of a light-absorbing heat-shielding member obtained in Example 1.
Figure 5:
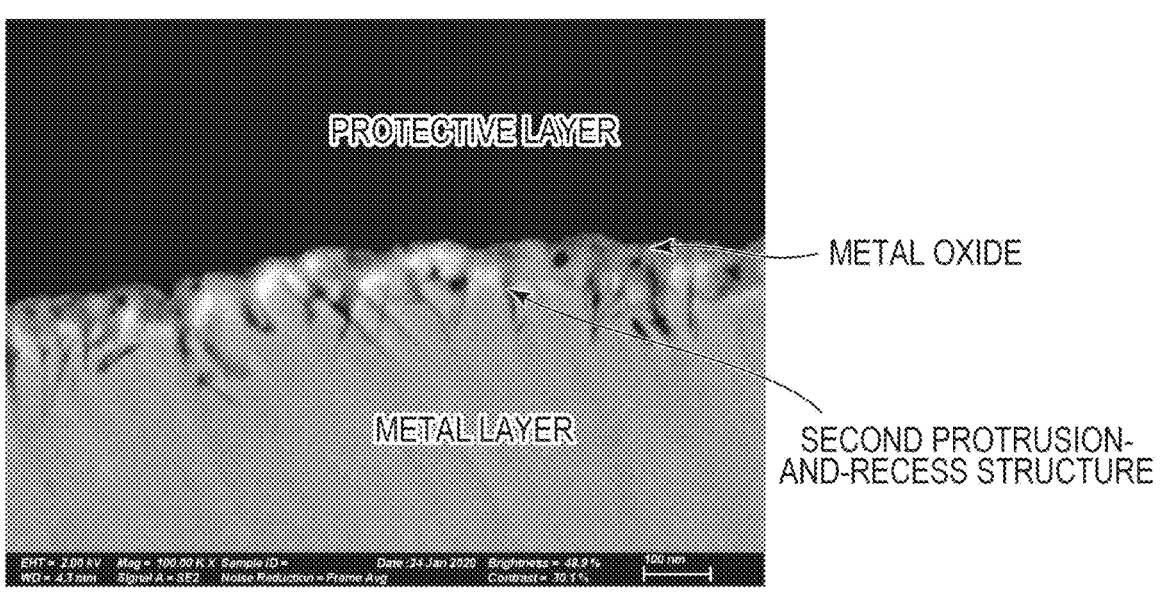
FIG. 5 is an electron microscopic view of a cross section of a light-absorbing heat-shielding member obtained in Example 1.

After a protective layer was formed on the film surface side of the light-absorbing heat-shielding film, a section was taken by a focused ion beam processing apparatus (trade name: EM-TIC-3X, available from Leica), and the section was observed with a SEM. The section was observed with a scanning electron microscope (trade name: Ultra55, available from Carl Zeiss). FIG. 4 illustrates an image observed at a magnification of 1,000× (low magnification), and FIG. 5 illustrates an image observed at a magnification of 100, 000× (high magnification). From FIG. 4, a coarse structure originating from the base material is observed. From FIG. 5, the fine structure of the fine protrusion-and-recess structure of aluminum oxide is observed. The results indicate that the resulting light-absorbing heat-shielding film is formed of a hierarchical structure including two different structures: a large structure (first structure) originating from the base material and a small structure (second structure) originating from the fine protrusion-and-recess shape of aluminum oxide. In addition, in the observation images of the cross section, it is found that five or more protruding portions in the second structure are included in one protruding portion in the first structure. That is, it is found that one protruding portion of the observation image observed at a magnification of 1,000× in FIG. 4 includes seven or more protruding portions observed in the observation image observed at a magnification of 100,000× in FIG. 5.

Table 1 presents the surface roughness of the resulting light-absorbing heat-shielding film.

The surface roughness was calculated from image analysis. The method of image analysis is as follows: Image analysis software Image J (available from NIH Image, https://imagej.nih.gov/ij/) was used for image processing. The average roughness Ra in each obtained cross-sectional SEM image was calculated as follows: A gray scale image was binarized, and a roughness curve of the uneven surface was digitized by Line Graph. From the digitized roughness curve, an average line was determined for the low magnification and high magnification as follows: At the low magnification, a linear expression was fitted to the digitized roughness curve by a least-squares method to determine an average line. At the high magnification, the digitized roughness curve was smoothed by a Savitzky-Golay filter to determine an average line. The average roughness Ra was calculated according to the formula (1), with Y being the difference between the digitized roughness curve and the average line, and X being the direction of the average line.

The first structure of the light-absorbing heat-shielding film obtained in Example 1 had an average roughness Ra of 0.2 μm and a maximum height Rz of 1.3 μm. The second structure had an average roughness Ra of 36 nm and a maximum height Rz of 165 nm.

Evaluation of Light-Absorbing Heat-Shielding Member

Figure 6:
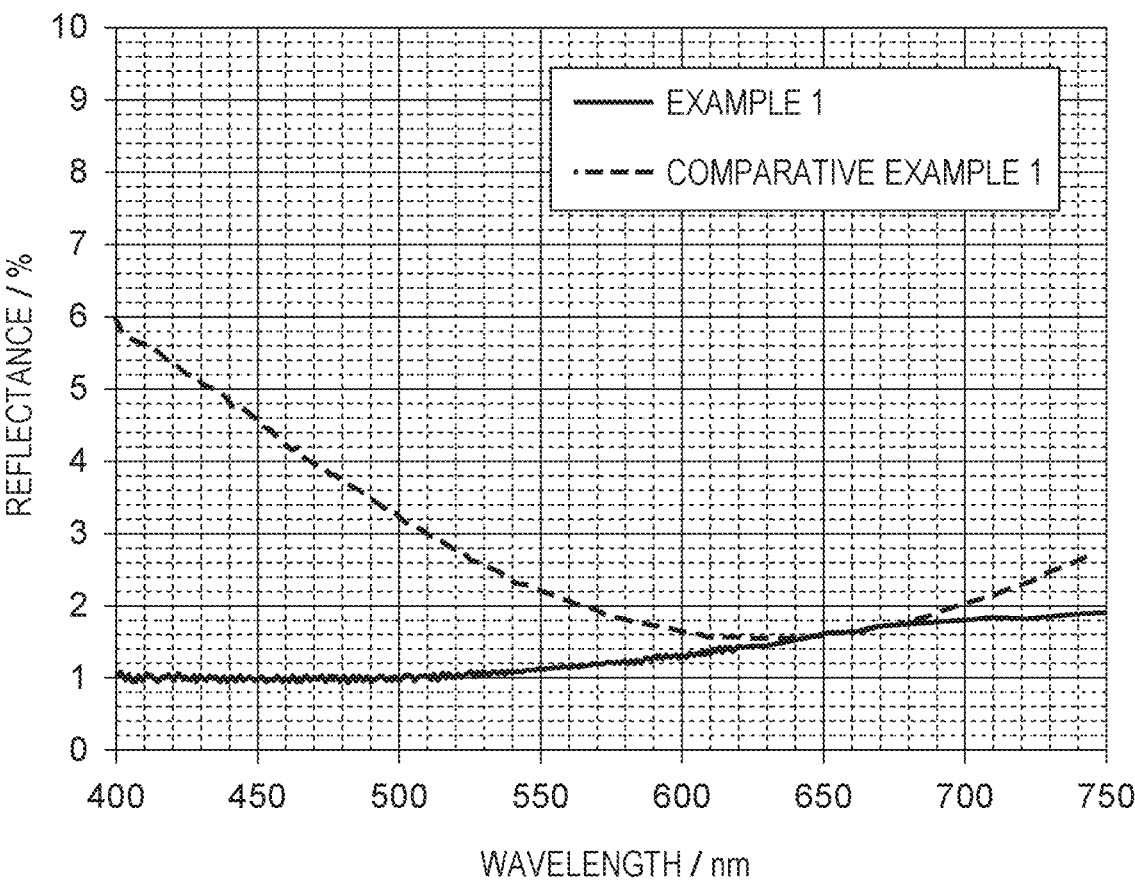
FIG. 6 illustrates the measurement results of the reflectance spectra in the visible light region of light-absorbing members obtained in Example 1 and Comparative example 1.
Figure 7:
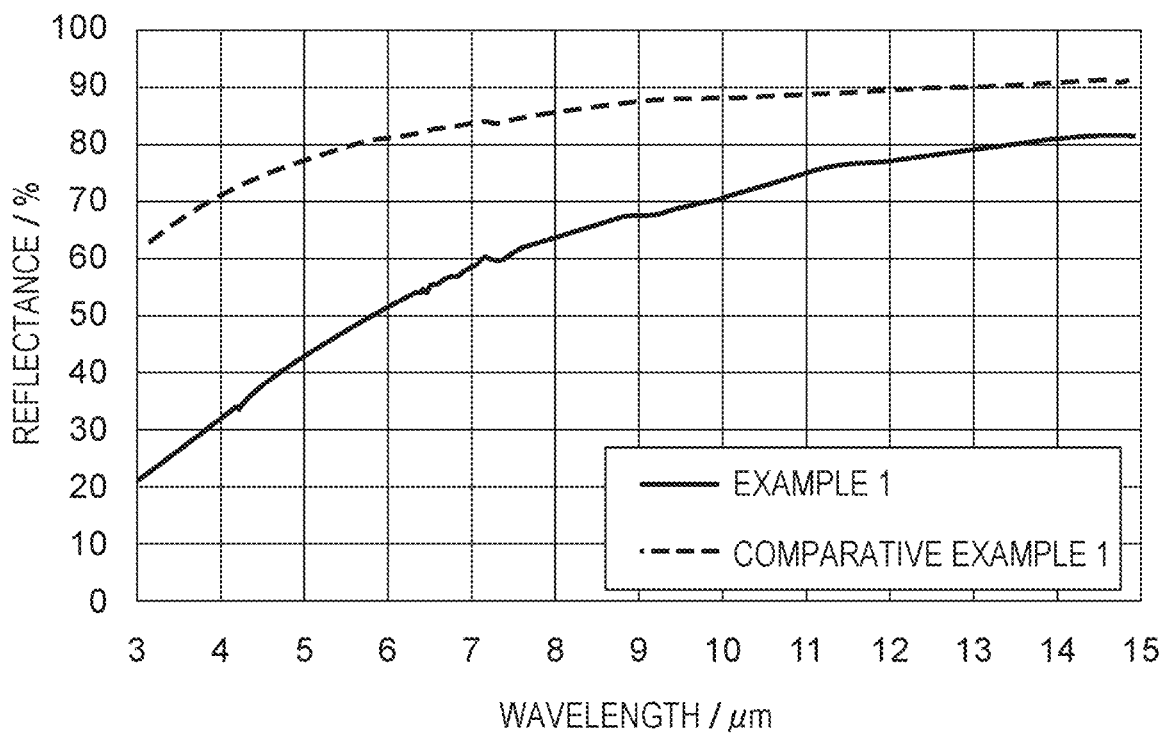
FIG. 7 illustrates the measurement results of the reflectance spectra in the infrared region of light-absorbing members obtained in Example 1 and Comparative example 1.

The light-absorbing heat-shielding member obtained in Example 1 was subjected to measurement of a reflectance spectrum in the visible light region and a reflectance spectrum in the infrared region. The reflectance spectrum measurement was performed using a lens reflectance measuring device (trade name: USPM-RU III, available from Olympus Corporation), and the reflectance spectrum measurement in the infrared region was performed using a Fourier transform infrared spectrophotometer (trade name: FT/IR-6600, available from JASCO Corporation). The results of the reflectance spectrum measurement in the visible light region are illustrated in FIG. 6. The results of the reflectance spectrum measurement in the infrared region are illustrated in FIG. 7. Table 1 presents the reflectances in the visible light region and the infrared region of the light-absorbing heat-shielding member obtained by the reflectance spectrum measurement in the visible light region and the infrared region. In Table 1, a member having a low reflectance in the visible light region and excellent light absorption properties was evaluated as A. A member having a higher reflectance toward the long wavelength side in the mid- to far-infrared region and excellent heat shielding properties was evaluated as A.

FIG. 6 indicates that the light-absorbing heat-shielding member of this example is excellent in light absorption properties because of its low reflectance in the visible light region.

FIG. 7 indicates that the light-absorbing heat-shielding member of this example has excellent heat shielding properties because the reflectance increases toward the long wavelength side in the mid- to far-infrared region.

Table 1 presents the results of photographing the light-absorbing heat-shielding member with a thermal imaging camera (infrared camera) at different photographing angles in eight directions spaced at 45°.

In Table 1, a member in which the reflections of an ambient light source were not observed from any angle and glare due to the reflections from the ambient light source was small was evaluated as A. A member in which a heat-shielding subject was difficult to see due to reflections from the ambient light source depending on the angle (intense reflection (glare) of light emitted from the light source) was evaluated as B.

Example 2

A light-absorbing heat-shielding film was produced as in Example 1, except that the base material was changed to #600 ground glass.

Example 3

A light-absorbing heat-shielding film was produced as in Example 1, except that the base material was changed to #400 ground glass.

Example 4

A light-absorbing heat-shielding film was produced as in Example 1, except that the base material was changed to #240 ground glass.

Example 5

A light-absorbing heat-shielding film was produced as in Example 1, except that the base material was changed to #120 ground glass.

Table 1 presents the surface roughness and the reflectances in the visible light region and the infrared region obtained by the measurement of the reflection spectra in the visible light region and the infrared region of the light-absorbing heat-shielding films produced in Examples 1 to 5.

Example 6

An article in which the light-absorbing heat-shielding film produced in Example 1 was attached to a surface of a plate-shaped stainless steel (SUS) (hereinafter, referred to as an "article including a light-absorbing heat-shielding film") was produced. The article including the light-absorbing heat-shielding film and an article, which was the same as the article including the light-absorbing heat-shielding film on its surface, except that it did not include the light-absorbing heat-shielding film, (hereinafter, referred to as an "article including no light-absorbing heat-shielding film"), were placed on the heater. When the surface temperature of the article including no light-absorbing heat-shielding film reached 40° C., the infrared thermography device (model: H2640, available from Nippon Avionics Co., Ltd.) was used to measure the surface temperatures of the article including the light-absorbing heat-shielding film and the article including no light-absorbing heat-shielding film. The measurement environment for the surface temperature was at room temperature, and the distance between the article and the measurement device was about 40 cm. The article including the light-absorbing heat-shielding film had a surface temperature of about 30° C., which was about 10° C. lower than the surface temperature of the article including no light-absorbing heat-shielding film. When the surface temperature of the article including no light-absorbing heat-shielding film was set to about 60° C., the surface temperature of the article including the light-absorbing heat-shielding film was about 36° C., which was about 24° C. lower. The above-described results indicated that the light-absorbing heat-shielding film in this example had excellent heat shielding properties. A clear temperature difference was observed between the detection temperature of the article and the actual temperature, and it was found that the article was able to be identified by the infrared thermal imaging camera.

Moreover, it was found that the article including the light-absorbing heat-shielding film produced in Example 1 reduced the reflections of the ambient light source.

The light-absorbing heat-shielding films obtained in Examples 2 to 5 were also evaluated in the same manner. The results indicated that the detection temperature at the surface of the light-absorbing heat-shielding film opposite to the surface in contact with the member or article was at least 3° C. lower than the detection temperature at the portion of the member or article where the light-absorbing heat-shielding film was not disposed, and that the heat shielding properties were exhibited. It was also found that the reflections of an ambient light source were reduced, as in the article of Example 1.

Comparative Example

A light-absorbing heat-shielding film was produced as in Example 1, except that the base material was changed to mirror-polished glass. Under the same conditions as in the light-absorbing heat-shielding member of Example 1, a reflectance spectrum in a visible light region and a reflectance spectrum in an infrared region were measured, and photographing with a thermal imaging camera (infrared camera) was performed. FIGS. 6 and 7 and Table 1 present the results.

TABLE 1

| | Surface roughness | | | | Reflectance (%) | | | | | | Visible light | Heat | Reflection of light source |
| | First structure large | | Second structure small | | Visible light region | | | Far-infrared region | | | absorption properties | shielding properties | around thermal imaging camera |
| | Ra (μm) | Rz (μm) | Ra (nm) | Rz (nm) | 450 nm | 550 nm | 650 nm | 3 μm | 5 μm | 10 μm | | | |
|---|---|---|---|---|---|---|---|---|---|---|---|---|---|
| Example 1 | 0.2 | 1.3 | 36 | 165 | 1.0 | 1.1 | 1.6 | 21 | 43 | 70 | A | A | A |
| Example 2 | 0.4 | 2.4 | 33 | 113 | 1.0 | 1.3 | 1.7 | 11 | 22 | 47 | A | A | A |
| Example 3 | 0.5 | 3.0 | 38 | 158 | 1.0 | 1.1 | 1.5 | 9 | 15 | 32 | A | A | A |
| Example 4 | 1.1 | 6.9 | 34 | 265 | 0.7 | 1.0 | 1.4 | 7 | 10 | 18 | A | A | A |
| Example 5 | 1.7 | 8.2 | 31 | 237 | 0.9 | 1.1 | 1.5 | 5 | 6 | 6 | A | A | A |
| Comparative example 1 | — | — | 35 | 183 | 4.6 | 2.2 | 1.6 | 62 | 77 | 88 | A | A | B |

The above-described results indicated that the article of the embodiment was excellent in both light absorption properties and heat shielding properties while the reflections of the ambient light source were reduced.

According to the embodiment, it is possible to provide the light-absorbing heat-shielding film and the light-absorbing heat-shielding member that absorb visible light and near-infrared light (low reflectance) and have low far-infrared radiation (high reflectance), which are normally incompatible.

According to the present invention, it is possible to provide the light-absorbing heat-shielding film having excellent light absorption and heat shielding properties.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A light-absorbing heat-shielding film, comprising a metal layer,
  wherein the metal layer includes:
  a base section in which the metal layer is continuous in an extending direction of the light-absorbing heat-shielding film, and
  a protrusion-and-recess shaped section disposed on the base section,
  the protrusion-and-recess shaped section includes:
  a first protrusion-and-recess structure including multiple protruding portions, and
  a second protrusion-and-recess structure disposed on each of the multiple protruding portions, the second protrusion-and-recess structure including multiple protruding portions,
  the base section extends below the multiple protruding portions included in the first protrusion-and-recess structure,
  main components of metal materials of the base section, the first protrusion-and-recess structure, and the second protrusion-and-recess structure are identical,
  the first protrusion-and-recess structure has an average roughness Ra1 of 0.1 μm or more and 5 μm or less, and the second protrusion-and-recess structure has an average roughness Ra2 of 1 nm or more and 50 nm or less, and
  the first protrusion-and-recess structure has a maximum height Rz1 of 1 μm or more and 10 μm or less, and the second protrusion-and-recess structure has a maximum height Rz2 of 100 nm or more and 800 nm or less.

2. The light-absorbing heat-shielding film according to claim 1, wherein each of the metal materials of the base section, the first protrusion-and-recess structure, and the second protrusion-and-recess structure contains one selected from nickel, chromium, and zinc.

3. The light-absorbing heat-shielding film according to claim 1, wherein the base section has a thickness of 200 nm or more.

4. The light-absorbing heat-shielding film according to claim 1, wherein a metal oxide layer covering the protrusion-and-recess shaped section is included.

5. The light-absorbing heat-shielding film according to claim 1, wherein seven or more protruding portions among the multiple protruding portions included in the second protrusion-and-recess structure are arranged at one protruding portion among the multiple protruding portions included in the first protrusion-and-recess structure.

6. A light-absorbing heat-shielding member, comprising:
  a substrate; and
  the light-absorbing heat-shielding film according to claim 1, the light-absorbing heat-shielding film being disposed on the substrate.

7. The light-absorbing heat-shielding member according to claim 6, wherein an adhesive layer that bonds the light-absorbing heat-shielding film and the substrate is included.

8. The light-absorbing heat-shielding member according to claim 6, wherein the substrate comprises a metal.

9. An article, comprising:
  the light-absorbing heat-shielding film according to claim 1, wherein the light-absorbing heat-shielding film is configured to reduce a reflection of an ambient light source.

10. A transport apparatus, comprising:
  at least one of an engine and a motor; and
  the light-absorbing heat-shielding film according to claim 1.

11. A light-absorbing heat-shielding film, comprising a metal layer,
  wherein the metal layer includes a protrusion-and-recess shaped section,
  the protrusion-and-recess shaped section includes:
  a first protrusion-and-recess structure including multiple protruding portions, and
  a second protrusion-and-recess structure disposed on each of the multiple protruding portions, the second protrusion-and-recess structure including multiple protruding portions, main components of metal materials of the first protrusion-and-recess structure and the second protrusion-and-recess structure are identical, a metal oxide attached to a surface of the protrusion-and-recess shaped section is included, the first protrusion-and-recess structure has an average roughness Ra1 of 0.1 μm or more and 5 μm or less, and the second protrusion-and-recess structure has an average roughness Ra2 of 1 nm or more and 50 nm or less, and the first protrusion-and-recess structure has a maximum height Rz1 of 1 μm or more and 10 μm or less, and the second protrusion-and-recess structure has a maximum height Rz2 of 100 nm or more and 800 nm or less.

12. The light-absorbing heat-shielding film according to claim 11, wherein the metal oxide has a different metal component from a metal component of the metal layer.

13. The light-absorbing heat-shielding film according to claim 11, wherein the metal oxide is disposed between the multiple protruding portions included in the second protrusion-and-recess structure.

14. The light-absorbing heat-shielding film according to claim 11, wherein the metal oxide contains aluminum oxide.

15. The light-absorbing heat-shielding film according to claim 11, wherein the metal oxide contains a crystal containing aluminum oxide as a main component.

16. The light-absorbing heat-shielding film according to claim 11, wherein a metal oxide layer covering the protrusion-and-recess shaped section is included, and the metal oxide is disposed between the metal oxide layer and the metal layer.

17. The light-absorbing heat-shielding film according to claim 16, wherein the metal oxide layer contains an amorphous gel of aluminum oxide.

18. An article, comprising:

a heat-generating element; and a light-absorbing heat-shielding film including a metal layer, wherein the light-absorbing heat-shielding film is configured to block heat from the heat-generating element, the metal layer includes:

a base section, and a protrusion-and-recess shaped section disposed on the base section, the protrusion-and-recess shaped section includes:

a first protrusion-and-recess structure including multiple protruding portions, and a second protrusion-and-recess structure disposed on each of the multiple protruding portions, the second protrusion-and-recess structure including multiple protruding portions, the base section extends below the multiple protruding portions included in the first protrusion-and-recess structure, main components of metal materials of the base section, the first protrusion-and-recess structure, and the second protrusion-and-recess structure are identical, the first protrusion-and-recess structure has an average roughness Ra1 of 0.1 μm or more and 5 μm or less, and the second protrusion-and-recess structure has an average roughness Ra2 of 1 nm or more and 50 nm or less, and the first protrusion-and-recess structure has a maximum height Rz1 of 1 μm or more and 10 μm or less, and the second protrusion-and-recess structure has a maximum height Rz2 of 100 nm or more and 800 nm or less.

19. The article according to claim 18, wherein a detection temperature at a surface of the light-absorbing heat-shielding film opposite to a surface adjacent to the heat-generating element is at least 3° C. lower than a detection temperature at a portion of the heat-generating element where the light-absorbing heat-shielding film is not disposed.

20. A method for producing a light-absorbing heat-shielding film, comprising the steps of:

providing a mold having a protrusion-and-recess shape; and forming, on the mold, a metal layer to which the protrusion-and-recess shape is transferred, wherein the mold has a protrusion-and-recess structure including multiple recessed portions, and the protrusion-and-recess shape includes:

a first protrusion-and-recess structure including multiple protruding portions, and a second protrusion-and-recess structure disposed on each of the multiple protruding portions, the second protrusion-and-recess structure including multiple protruding portions, the first protrusion-and-recess structure has an average roughness Ra1 of 0.1 μm or more and 5 μm or less, and the second protrusion-and-recess structure has an average roughness Ra2 of 1 nm or more and 50 nm or less, and the first protrusion-and-recess structure has a maximum height Rz1 of 1 μm or more and 10 μm or less, and the second protrusion-and-recess structure has a maximum height Rz2 of 100 nm or more and 800 nm or less.

21. The production method according to claim 20, wherein the protrusion-and-recess shape is formed by immersion treatment of a film containing aluminum in hot water.

22. A method for producing a light-absorbing heat-shielding member, comprising the steps of:

providing a mold having a protrusion-and-recess shape;

forming, on the mold, a metal layer to which the protrusion-and-recess shape is transferred; and bonding a substrate to a surface of the metal layer opposite to a surface to which the protrusion-and-recess shape is transferred, wherein the mold has a protrusion-and-recess structure including multiple recessed portions, and the protrusion-and-recess shape includes:

a first protrusion-and-recess structure including multiple protruding portions, and a second protrusion-and-recess structure disposed on each of the multiple protruding portions, the second protrusion-and-recess structure including multiple protruding portions, the first protrusion-and-recess structure has an average roughness Ra1 of 0.1 μm or more and 5 μm or less, and the second protrusion-and-recess structure has an average roughness Ra2 of 1 nm or more and 50 nm or less, and the first protrusion-and-recess structure has a maximum height Rz1 of 1 μm or more and 10 μm or less, and the second protrusion-and-recess structure has a maximum height Rz2 of 100 nm or more and 800 nm or less.

23. The production method according to claim 22, wherein the substrate comprises a metal.

24. The production method according to claim 23, further comprising a step of removing at least part of the mold from a top of the metal layer.

25. The production method according to claim 24, wherein the mold includes a base body and a metal oxide disposed over the base body, and after the removal step, at least part of the metal oxide attached to the metal layer is removed from the top of the metal layer.

26. The production method according to claim 24, wherein the mold includes a base body and a metal oxide disposed over the base body, and the metal oxide forms the protrusion-and-recess shape.

\* \* \* \* \*